United States Patent
Gillo et al.

(10) Patent No.: US 9,259,641 B2
(45) Date of Patent: Feb. 16, 2016

(54) ENTERTAINMENT DEVICE AND METHOD

(75) Inventors: Tomas Owen Gillo, London (GB); Scott Christopher Waugaman, London (GB); Mitchell Goodwin, London (GB)

(73) Assignee: Sony Computer Entertainment Europe Limited (GB)

( * ) Notice: Subject to any disclaimer, the term of this patent is extended or adjusted under 35 U.S.C. 154(b) by 1052 days.

(21) Appl. No.: 12/528,937

(22) PCT Filed: Feb. 29, 2008
(Under 37 CFR 1.47)

(86) PCT No.: PCT/GB2008/000682
§ 371 (c)(1),
(2), (4) Date: Apr. 15, 2010

(87) PCT Pub. No.: WO2008/104785
PCT Pub. Date: Sep. 4, 2008

(65) Prior Publication Data
US 2011/0269540 A1    Nov. 3, 2011

Related U.S. Application Data

(60) Provisional application No. 60/892,397, filed on Mar. 1, 2007.

(30) Foreign Application Priority Data

Mar. 1, 2007  (GB) .................................. 0703974.6
Mar. 5, 2007  (GB) .................................. 0704235.1

(51) Int. Cl.
*A63F 13/00* (2014.01)
*A63F 13/358* (2014.01)
(Continued)

(52) U.S. Cl.
CPC ............... *A63F 13/00* (2013.01); *A63F 13/005* (2013.01); *A63F 13/12* (2013.01); *A63F 13/33* (2014.09);
(Continued)

(58) Field of Classification Search
CPC ....... A63F 13/00; A63F 13/12; A63F 13/005; A63F 13/33; A63F 13/35; A63F 13/358
USPC ............................................................ 463/61
See application file for complete search history.

(56) References Cited

U.S. PATENT DOCUMENTS

2002/0126133 A1* 9/2002 Ewins ............................ 345/587
2003/0069069 A1* 4/2003 Kinjo et al. ..................... 463/30
(Continued)

FOREIGN PATENT DOCUMENTS

EP       1669114      6/2006
JP       07178244 A   7/1995
(Continued)

OTHER PUBLICATIONS

International Search Report and Written Opinion dated Jun. 6, 2008 from the corresponding PCT/GB2008/000682.
(Continued)

*Primary Examiner* — Milap Shah
*Assistant Examiner* — Thomas H Henry
(74) *Attorney, Agent, or Firm* — Lenner, David, Littenberg, Krumholz & Mentlik, LLP

(57) ABSTRACT

An entertainment device comprises a detector operable to detect whether a representation of a game feature of one or more games associated with the entertainment device should be obtained from the one or more games in response to a predetermined game event of the one or more games, a processor operable to obtain the representation of the game feature from the one or more games, a storage arrangement operable to store the representation of the game feature obtained from the one or more games, and a renderer operable to render the obtained representation of the game feature stored in the storage arrangement as a game feature within a virtual environment associated with the entertainment device, the rendered game feature within the virtual environment being a trophy object.

47 Claims, 17 Drawing Sheets

(51) Int. Cl.
*A63F 13/33* (2014.01)
*A63F 13/35* (2014.01)
*A63F 13/30* (2014.01)

(52) U.S. Cl.
CPC .............. *A63F 13/35* (2014.09); *A63F 13/358* (2014.09); *A63F 2300/61* (2013.01); *A63F 2300/64* (2013.01); *A63F 2300/66* (2013.01); *A63F 2300/807* (2013.01); *A63F 2300/8082* (2013.01)

(56) References Cited

U.S. PATENT DOCUMENTS

2004/0266537 A1   12/2004  Morris
2010/0304806 A1*  12/2010  Coleman et al. .................. 463/2

FOREIGN PATENT DOCUMENTS

| | | |
|---|---|---|
| JP | 2001079274 A | 3/2001 |
| JP | 2001252467 A | 9/2001 |
| JP | 2002239251 A | 8/2002 |
| JP | 2006158955 A | 6/2006 |
| JP | 2006158956 A | 6/2006 |
| WO | 0070557 | 11/2000 |

OTHER PUBLICATIONS

Linden Research et al: "Second Life" 19000101, Jan. 1, 1900, XP002478210, the whole document.

International Preliminary Report on Patentability (Chapter II of the Patent Cooperation Treaty) dated Jun. 18, 2009 from PCT/GB2008/000682.

Richard A. Bartle: "Designing Virtual Worlds" 19000101, Jan. 1, 1900, XP002478211; p. 17-p. 31.

Combined Search and Examination Report under Sections 17 and 18(3) from GB0704235.1 dated Jul. 6, 2007.

Japanese Office Action for 2009-551989 dated Feb. 21, 2012.

* cited by examiner

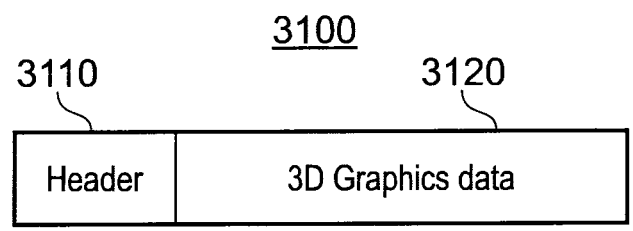
Fig. 12
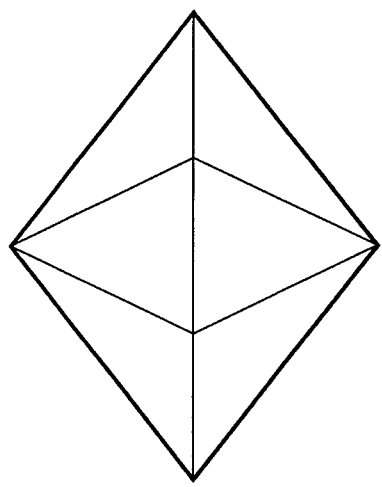 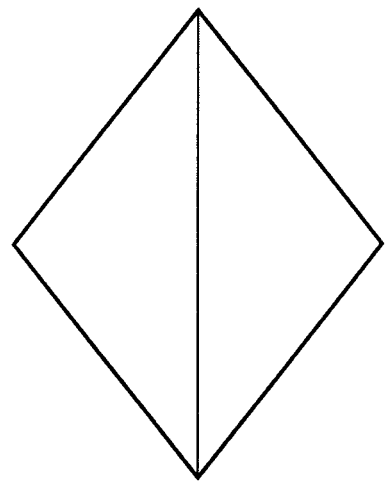
Fig. 13a    Fig. 13b

ENTERTAINMENT DEVICE AND METHOD

The present invention relates to an entertainment device and method.

Recently, video game devices have become available that enable connection to an online gaming system or servers via the internet. Examples of such systems are the Sony® PlayStation 3® (PS3®) entertainment device or the Xbox360® device manufactured by Microsoft®, which is provided with an online gaming service known as the Xbox Live® service.

In online gaming systems, it is known to provide means by which, on accomplishment of a certain task or activity within a game, a predetermined number of accomplishment points are awarded to a player for completion of that task or activity. These accomplishment points may then be summed together to give a player score that is representative of that particular player's gaming prowess. On deciding whether to participate in a particular online game, a user may view the player score of potential participants in the game by using the online gaming service. They may then decide if they want to start playing that game in dependence upon whether they think the potential participants are evenly matched, as indicated by the player scores of the participants. Additionally, this use of a player score allows players to brag about the size of their score to other players.

However, in some games it may be easier than in other games to complete the required task or activity necessary to gain the accomplishment points. Therefore, a player score based on the summation of accomplishment points may not portray an accurate or unbiased representation of the player's skill. Furthermore, given the recent advent of visually arresting and highly immersive games, the representation of a player's skill merely as a single number is a rather trite and uninteresting way of indicating the player's skill.

The present invention seeks to alleviate or mitigate the above problems.

In a first aspect, there is provided an entertainment device, comprising: a detector operable to detect whether a representation of a game feature of a game associated with the entertainment device should be obtained from the game in response to a predetermined game event of the game; a processor operable to obtain the representation of the game feature from the game; a storage arrangement operable to store the representation of the game feature obtained from the game; and a renderer operable to render the obtained representation of the game feature stored in the storage arrangement as a game feature within a virtual environment associated with the entertainment device, the rendered game feature within the virtual environment being a trophy object.

Preferably, there is provided an entertainment system comprising a plurality of the entertainment devices, in which the plurality of entertainment devices are operable to communicate with each other over a network.

In a second aspect, there is provided a method of rendering a virtual object within a virtual environment on an entertainment device, the method comprising: detecting whether a representation of a game feature of one or more games associated with the entertainment device should be obtained from the one or more games in response to a predetermined game event of the one or more games; obtaining the representation of the game feature from the one or more games; storing, in a storage arrangement, the representation of the game feature obtained from the one or more games; and rendering the obtained representation of the game feature stored in the storage arrangement as a game feature within a virtual environment associated with the entertainment device, the rendered game feature within the virtual environment being a trophy object.

Advantageously, the above aspects allow a representation of a game feature to be used to indicate a players skill when a player performs a certain activity within the game or when a game event takes place. For example, an activity accomplished within a game by a user may be associated with a representation of the game feature and rendered within the virtual environment of the entertainment device. The user may therefore view their accomplishments from different games within the same virtual environment. Additionally, the virtual environment may be advantageously used to display the representation of the game features(s) in a variety of visually exciting and appealing ways. Furthermore, by obtaining the representation of the game feature in dependence upon a game event, a user's accomplishments may be distinguished from each other rather than amalgamated into a single player score.

Embodiments of the present invention will now be described by way of example with reference to the accompanying drawings, in which:

FIG. 12 is a schematic diagram of a file structure used to store representations of the trophies in accordance with an embodiment of the present invention;

FIGS. 13a and 13b show a schematic representation of 3D polygon scaling in accordance with an embodiment of the present invention.

A video game apparatus and corresponding method of operation are disclosed. In the following description, a number of specific details are presented in order to provide a thorough understanding of embodiments of the present invention. It will be apparent however to a person skilled in the art that these specific details need not be employed to practise the present invention. Conversely, specific details known to the person skilled in the art are omitted for the purposes of clarity in presenting the embodiments.

Figure 1:
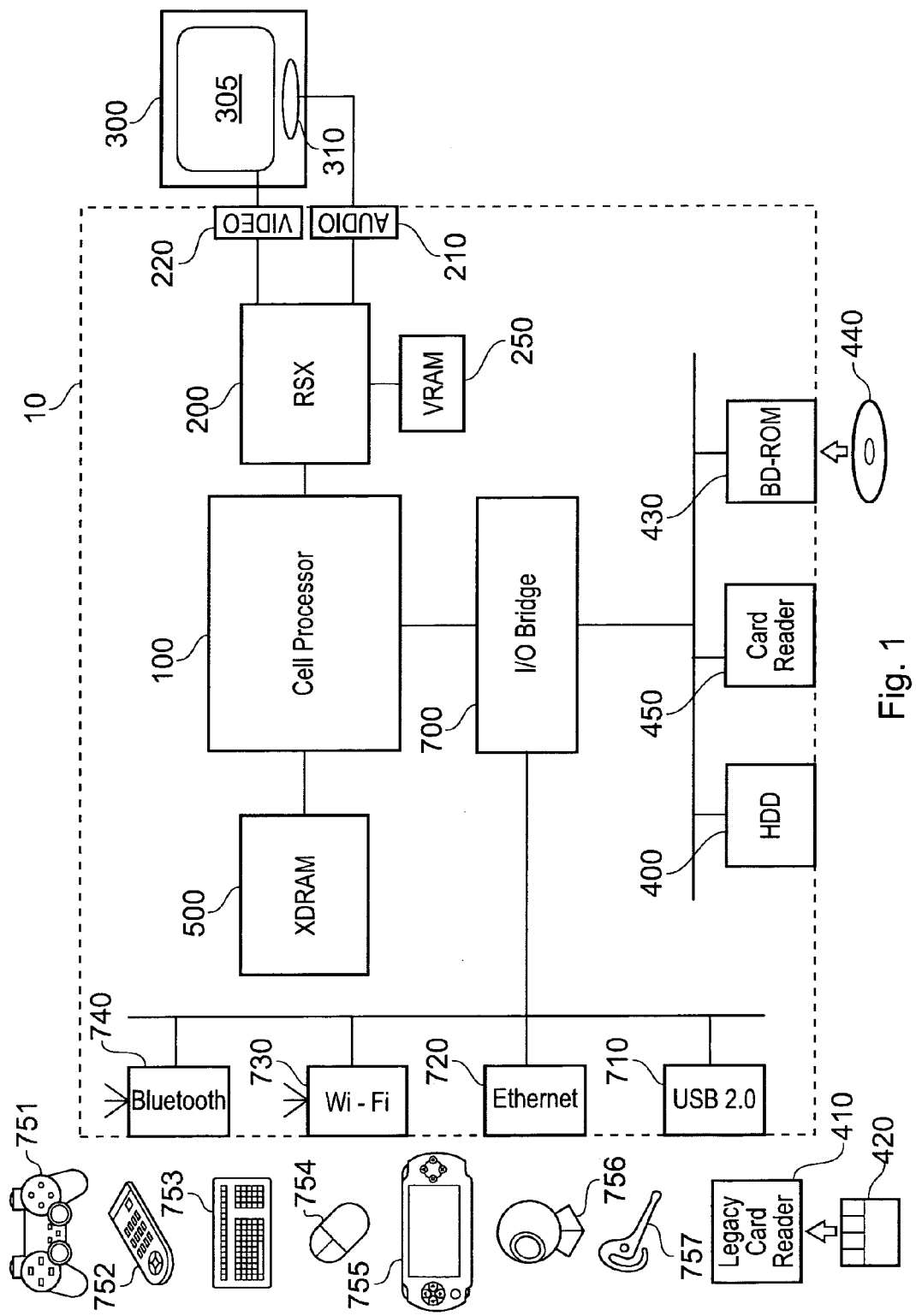
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to six Universal Serial Bus (USB) 2.0 ports 710; a gigabit Ethernet port 720; an IEEE 802.11b/g wireless network (Wi-Fi) port 730; and a Bluetooth® wireless link port 740 capable of supporting of up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
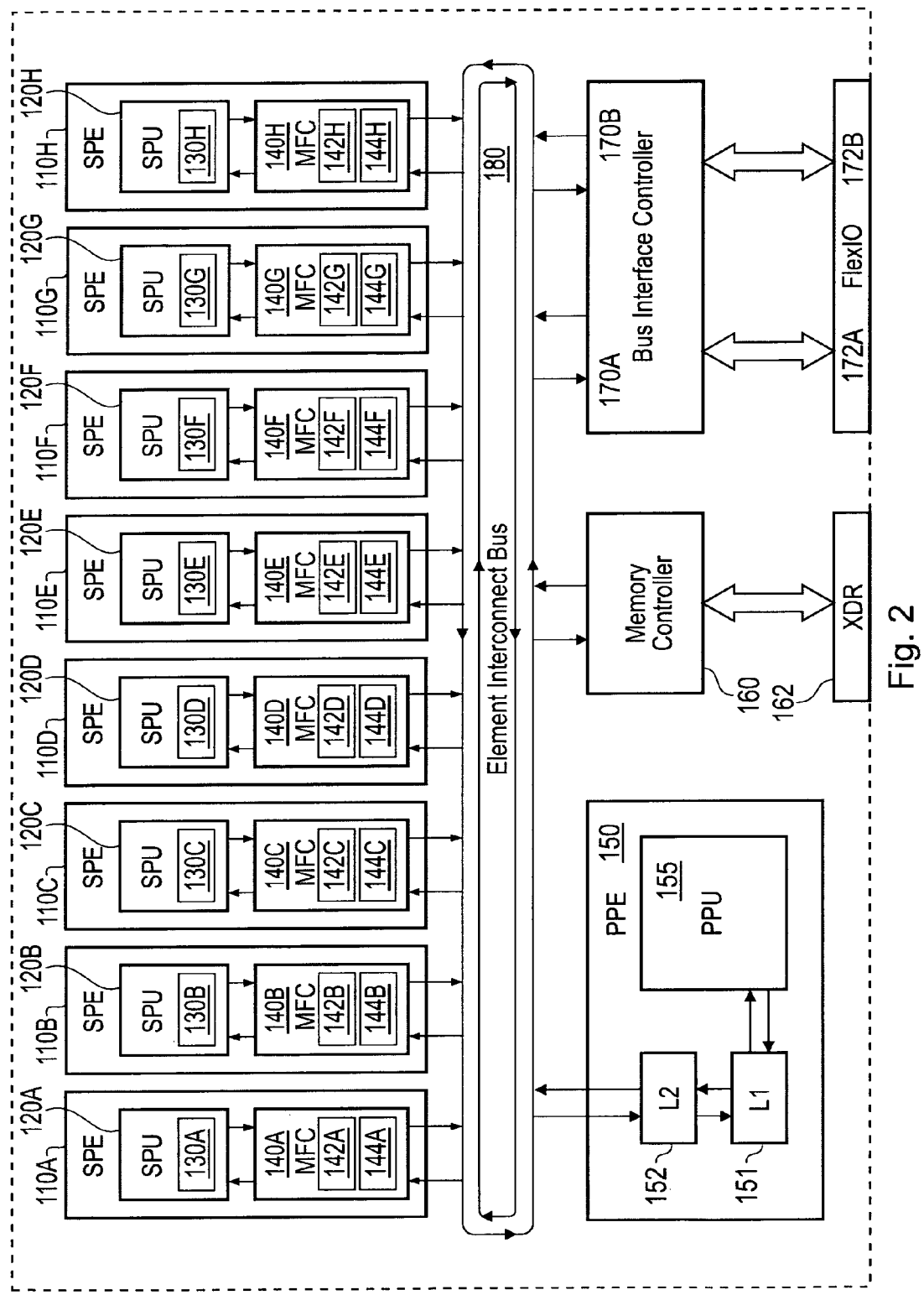
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
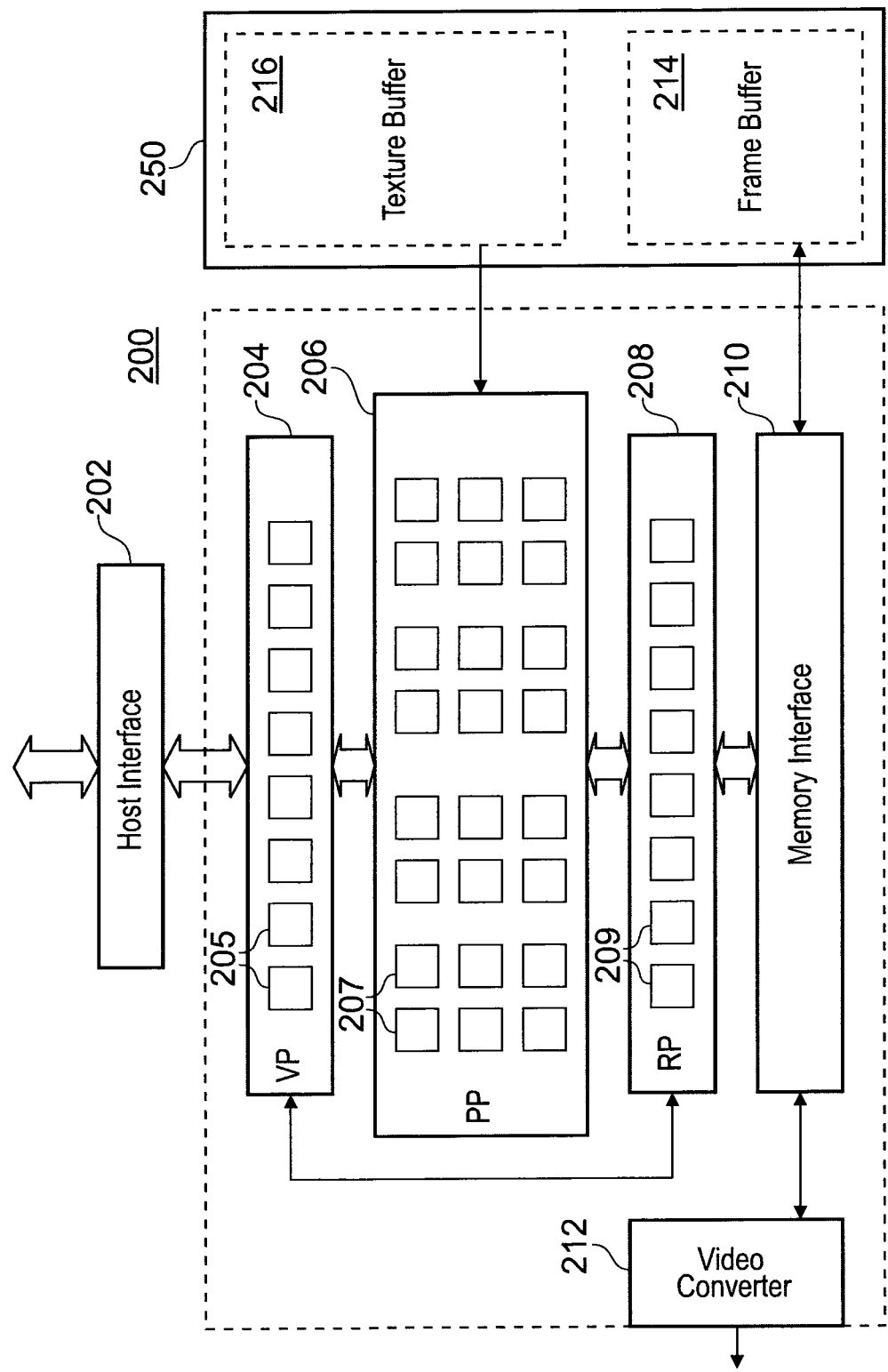
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the functions horizontally using a game controller 751, remote control 752 or other suitable control device so as to highlight the desired function, at which point options pertaining to that function appear as a vertically scrollable list centred on that function, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demos and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

In an embodiment of the present invention, the above-mentioned online capability comprises interaction with a virtual environment populated by avatars (graphical representations) of the user of the PS3 10 and of other PS3 users who are currently online.

The software to enable the virtual interactive environment is typically resident on the HDD 400, and can be upgraded and/or expanded by software that is downloaded, or stored on optical disk 440, or accessed by any other suitable means. Alternatively, the software may reside on a flash memory card 420, optical disk 440 or a central server (not shown).

In an embodiment of the present invention, the virtual interactive environment (hereafter called the 'Home' environment) is selected from the cross-media bar. The Home environment then starts in a conventional manner similar to a 3D video game by loading and executing control software, loading 3D models and textures into video memory 250, and rendering scenes depicting the Home environment. Alternatively or in addition, the Home environment can be initiated by other programs, such as a separate game.

Figure 4:
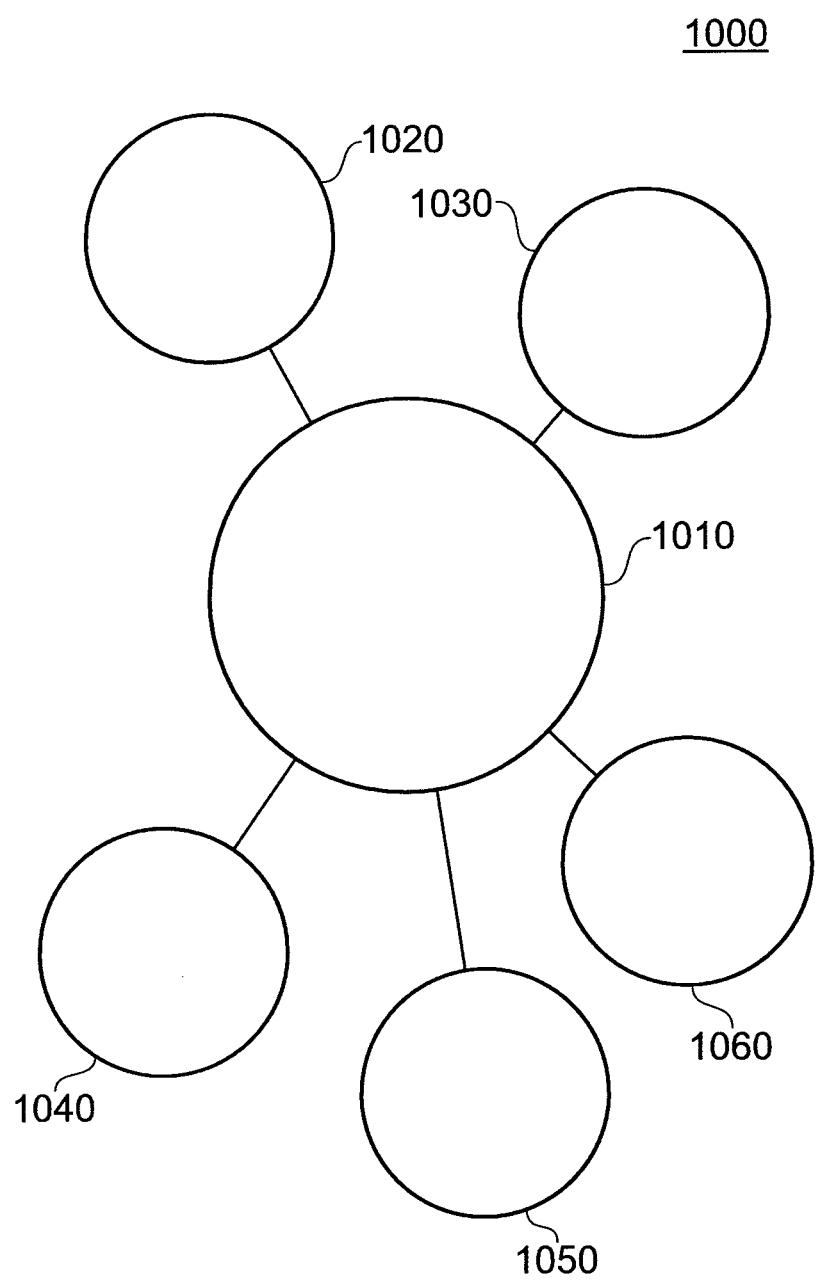
FIG. 4 is a schematic diagram of an interconnected set of game zones in accordance with an embodiment of the present invention.
Figure 5:
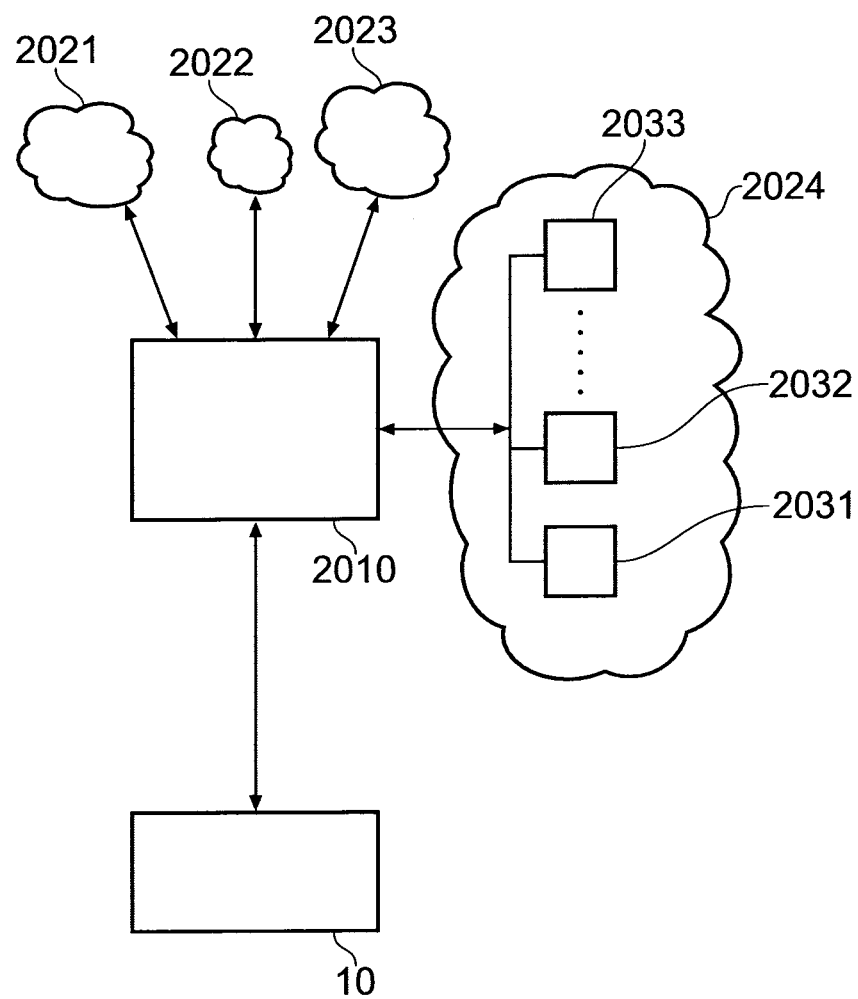
FIG. 5 is a schematic diagram of a Home environment online client/server arrangement in accordance with an embodiment of the present invention.

Referring now to FIG. 4, which displays a notional map of the Home environment, and FIG. 5, which is a schematic diagram of a Home environment online client/server arrangement, the user's avatar is spawned within a lobby zone 1010 by default. However, a user can select among other zones 1010-1060 (detailed below) of the map, causing the select zone to be loaded and the avatar to be spawned within that zone. In an embodiment of the present invention, the map screen further comprises a sidebar on which the available zones may be listed, together with management tools such as a ranking option, enabling zones to be listed in order of user preference, or such as most recently added and/or A-Z listings. In addition a search interface may allow the user to search for a zone by name. In an embodiment of the present invention, there maybe many more zones available than are locally stored on the user's PS3 at any one time; the local availability may be colour coded on the list, or the list may be filtered to only display locally available zones. If the user selects a locally unavailable zone, it can be downloaded from a Home environment Server 2010.

Figure 6A:
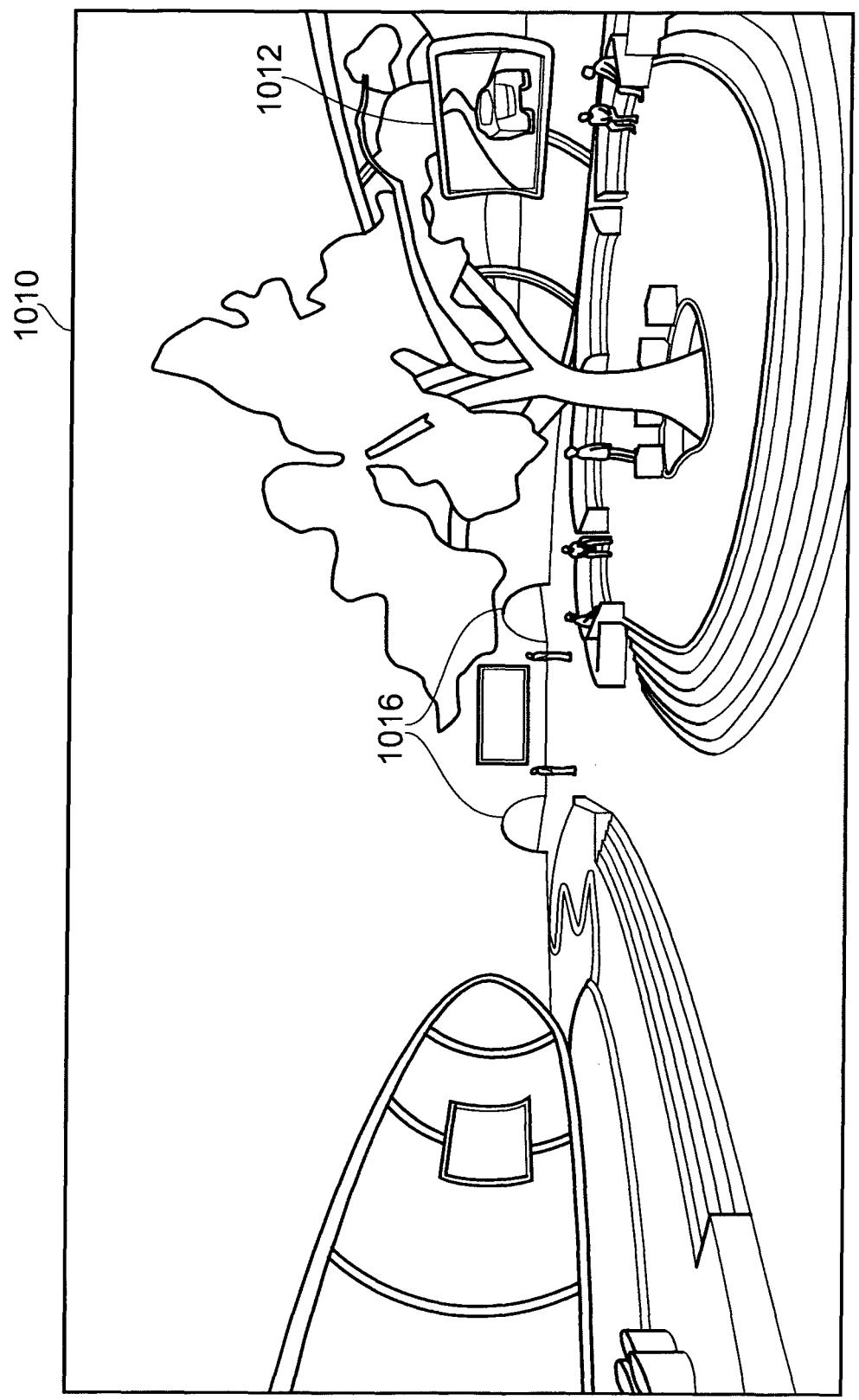
FIG. 6a is a schematic diagram of a lobby zone in accordance with an embodiment of the present invention.

Referring now to FIG. 6a, the lobby zone 1010 typically resembles a covered piazza, and may comprise parkland (grass, trees, sculptures etc.), and gathering spaces (such as open areas, single benches or rows of seats etc.) where users can meet through their avatars.

The lobby zone 1010 typically also comprises advertisement hoardings, for displaying either still or moving adverts for games or other content or products. These may be on the walls of the lobby, or may stand alone.

The lobby zone 1010 may also include an open-air cinema 1012 showing trailers, high-profile adverts or other content from third-party providers. Such content is typically streamed or downloaded from a Home environment server 2010 to which the PS3 10 connects when the Home environment is loaded, as described in more detail later.

The cinema screen is accompanied by seating for avatars in front of it, such that when an avatar sits down, the camera angle perceived by the user of the avatar also encompasses the screen.

Figure 6B:
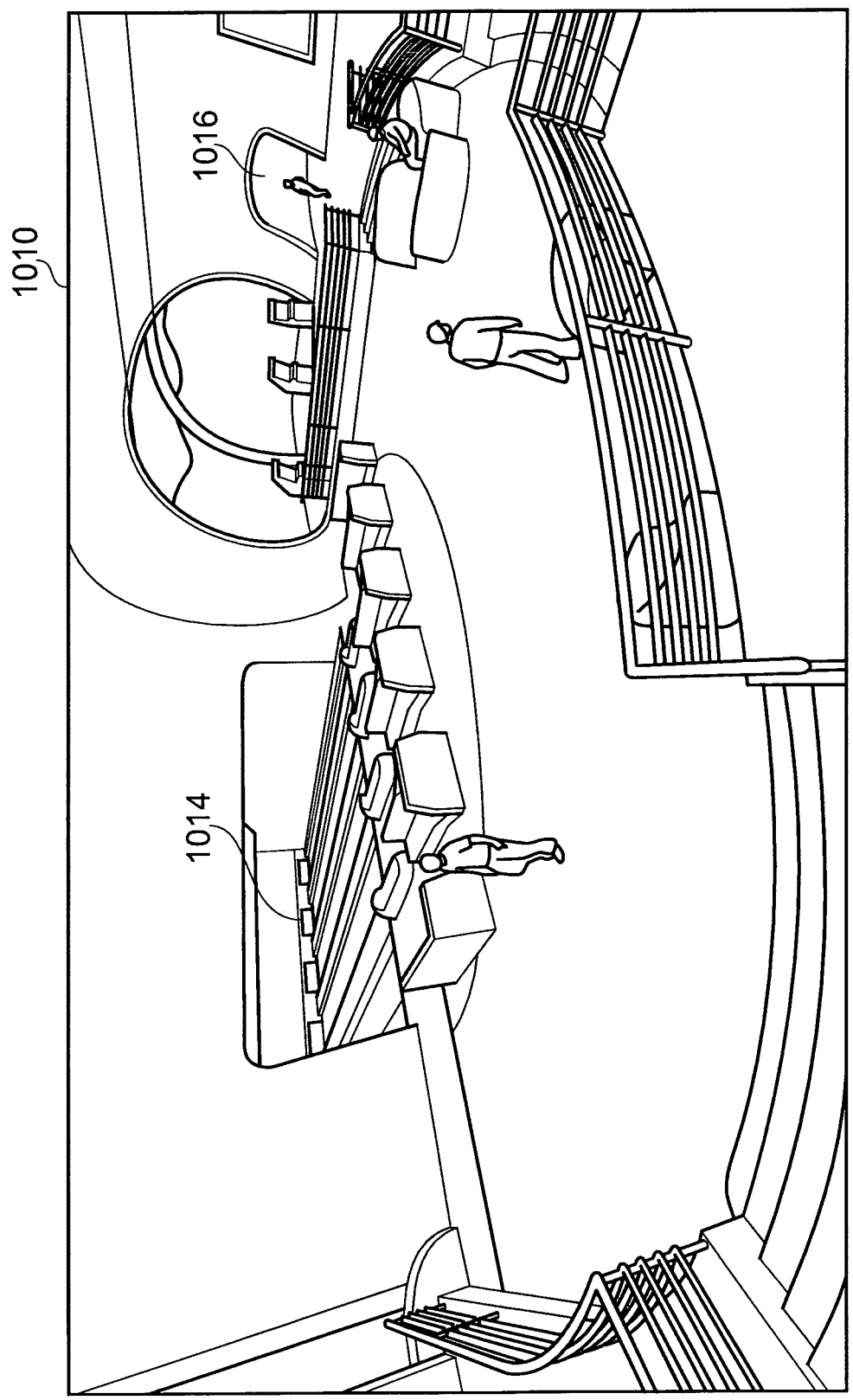
FIG. 6b is a schematic diagram of a lobby zone in accordance with an embodiment of the present invention.

Referring now also to FIG. 6b, the lobby zone 1010 may also include general amusements 1014, such as functioning pool tables, bowling alleys, and/or a video arcade. Games of pool or bowling may be conducted via the avatar, such that the avatar holds the pool cue or bowling ball, and is controlled in a conventional manner for such games. In the video arcade, if an avatar approaches a videogame machine, the home environment may switch to a substantially full-screen representation of the videogame selected. Such games may, for example, be classic arcade or console games such as Space Invaders®, or Pac-Man®, which are comparatively small in terms of memory and processing and can be emulated by the PS3 within the Home environment or run as plug-ins to the Home environment. In this case, typically the user will control the game directly, without representation by the avatar. The game will switch back to the default Home environment view if the user quits the game, or causes the avatar to move away from the videogame machine. In addition to classic arcade games, user-created game content may be featured on one or more of the virtual video game machines. Such content may be the subject of on-line competitions to be featured in such a manner, with new winning content downloaded on a regular basis.

In addition to the lobby zone 1010, other zones (e.g. zones 1020, 1030, 1040, 1050 and 1060, which may be rooms, areas or other constructs) are available. These may be accessed either via a map screen similar in nature to that of FIG. 4, or alternatively the user can walk to these other areas by guiding their avatar to various exits 1016 from the lobby.

Typically, an exit 1016 takes the form of a tunnel or corridor (but may equally take the form of an anteroom) to the next area. While the avatar is within the tunnel or anteroom, the next zone is loaded into memory. Both the lobby and the next zone contain identical models of the tunnel or anteroom, or the model is a common resource to both. In either case, the user's avatar is relocated from the lobby-based version to the new zone-based version of the tunnel or anteroom at the same position. In this way the user's avatar can apparently walk seamlessly throughout the Home environment, without the need to retain the whole environment in memory at the same time.

Figure 6C:
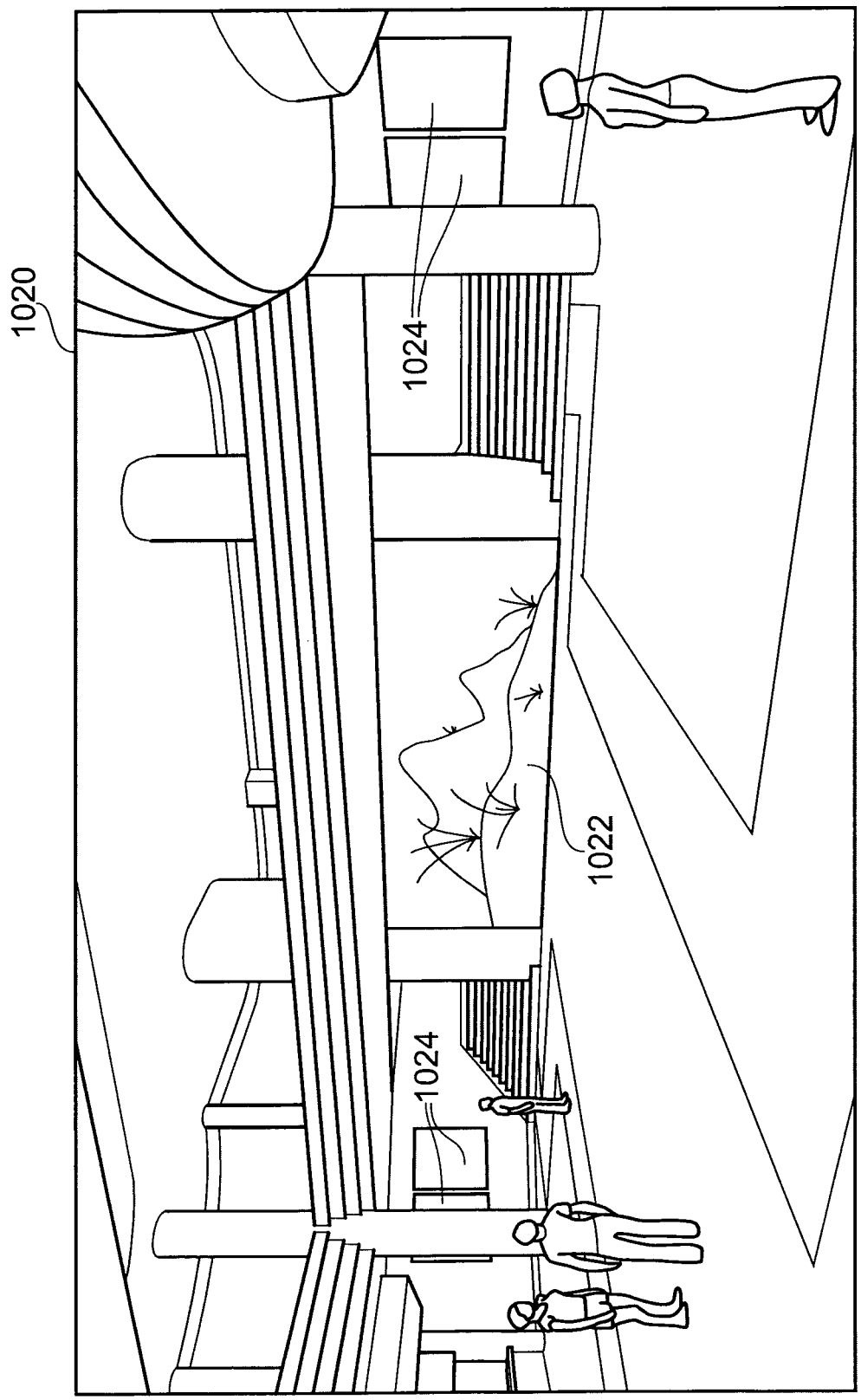
FIG. 6c is a schematic diagram of a cinema zone in accordance with an embodiment of the present invention.

Referring now also to FIG. 6c, one available zone is a Cinema zone 1020. The Cinema zone 1020 resembles a multiplex cinema, comprising a plurality of screens that may show content such as trailers, movies, TV programmes, or adverts downloaded or streamed from a Home environment server 2010 as noted previously and detailed below, or may show content stored on the HDD 400 or on an optical disk 440, such as a Blu-Ray disk.

Typically, the multiplex cinema will have an entrance area featuring a screen 1022 on which high-profile trailers and adverts may be shown to all visitors, together with poster adverts 1024, typically but not limited to featuring upcoming movies. Specific screens and the selection and display of the trailers and posters can each be restricted according to the age of the user, as registered with the PS3. This age restriction can be applied to any displayed content to which an age restriction tag is associated, in any of the zones within the Home environment.

In addition, in an embodiment of the present invention the multiplex cinema provides a number of screen rooms in which featured content is available, and amongst which the user can select. Within a screen room downloaded, streamed or locally stored media can be played within a virtual cinema environment, in which the screen is set in a room with rows of seats, screen curtains, etc. The cinema is potentially available to all users in the Home environment, and so the avatars of other users may also be visible, for example watching commonly streamed material such as a web broadcast. Alternatively, the user can zoom in so that the screen occupies the full viewing area.

Figure 6D:
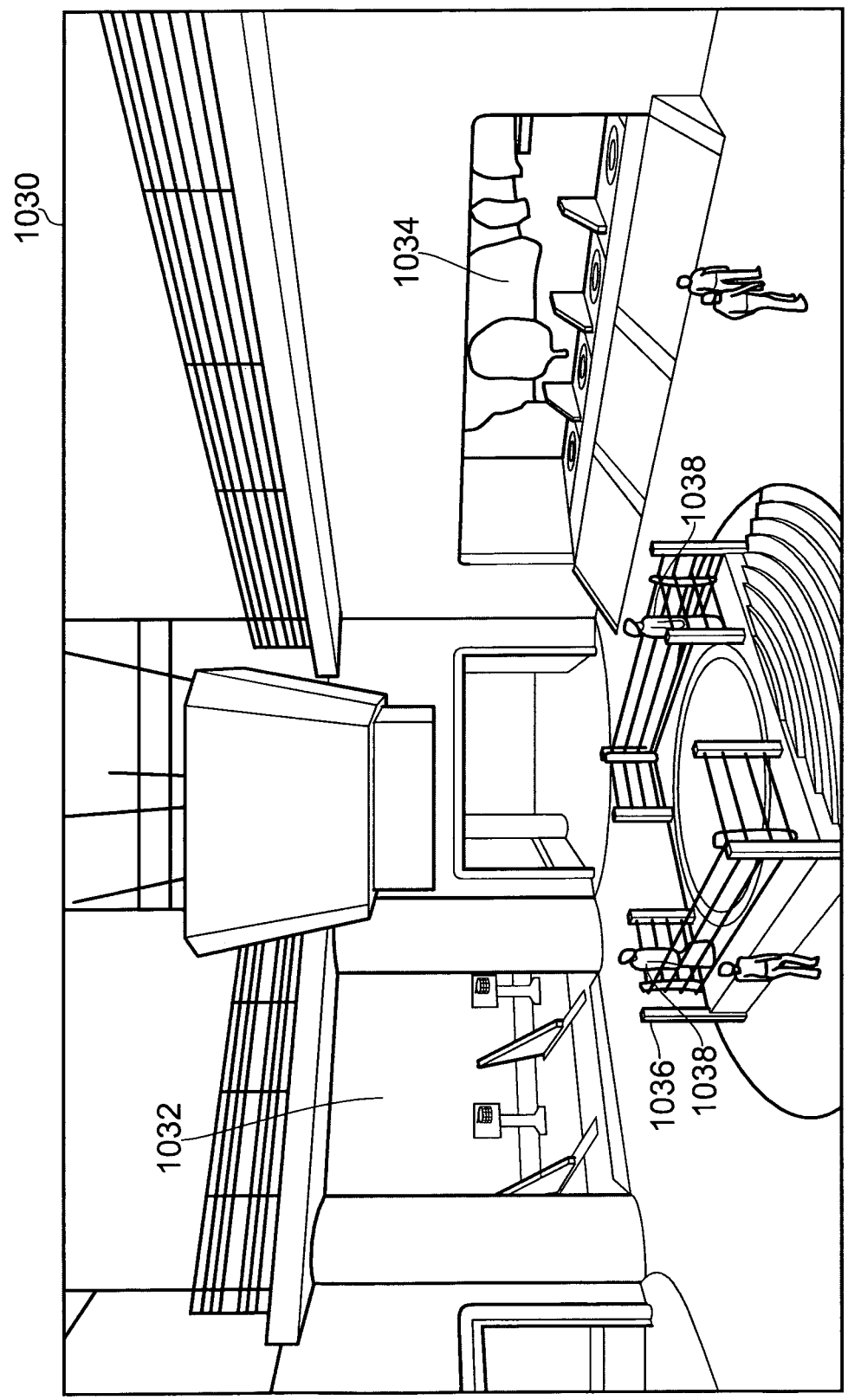
FIG. 6d is a schematic diagram of a developer/publisher zone in accordance with an embodiment of the present invention.

Referring now also to FIG. 6d, another type of zone is a developer or publisher zone 1030. Typically, there may be a plurality of such zones available. Optionally, each may have its own exit from the lobby area 1010, or alternatively some or all may share an exit from the lobby and then have separate exits from within a tunnel or ante-room model common to or replicated by each available zone therein. Alternatively they may be selected from a menu, either in the form of a pop-up menu, or from within the Home environment, such as by selecting from a set of signposts. In these latter cases the connecting tunnel or anteroom will appear to link only to the selected developer or publisher zone 1030. Alternatively or in addition, such zones may be selected via the map screen, resulting in the zone being loaded in to memory, and the avatar re-spawning within the selected zone.

Developer or publisher zones 1030 provide additional virtual environments, which may reflect the look and feel of the developer or publisher's products, brands and marks.

The developer or publisher zones 1030 are supplementary software modules to the Home environment and typically comprise additional 3D models and textures to provide the structure and appearance of the zone.

In addition, the software operable to implement the Home environment supports the integration of third party software via an application program interface (API). Therefore, developers can integrate their own functional content within the Home environment of their own zone. This may take the form of any or all of:

i. Downloading/streaming of specific content, such as game trailers or celebrity endorsements;
 ii. Changes in avatar appearance, behaviour and/or communication options within the zone;
 iii. The provision of one or more games, such as basketball 1032 or a golf range 1034, optionally branded or graphically reminiscent of the developer's or publisher's games;
 iv. One or more interactive scenes or vignettes representative of the developer's or publisher's games, enabling the player to experience an aspect of the game, hone a specific skill of the game, or familiarise themselves with the controls of a game;
 v. An arena, ring, dojo, court or similar area 1036 in which remotely played games may be represented live by avatars 1038, for spectators to watch.

Thus, for example, a developer's zone resembles a concourse in the developer's signature colours and featuring their logos, onto which open gaming areas, such as soccer nets, or a skeet range for shooting. In addition, a booth (not shown) manned by game-specific characters allows the user's avatar to enter and either temporarily change into the lead character of the game, or zoom into a first person perspective, and enter a further room resembling a scene from the featured game. Here the user interacts with other characters from the game, and plays out a key scene. Returning to the concourse, adverts for the game and other content are displayed on the walls. At the end of the zone, the concourse opens up into an arena where a 5-a-side football match is being played, where the positions of the players and the ball correspond to a game currently being played by a popular group, such as a high-ranking game clan, in another country.

In embodiments of the present invention, developer/publisher zones are available to download. Alternatively or in addition, to reduce bandwidth they may be supplied as demo content on magazine disks, or may be installed/upgraded from disk as part of the installation process for a purchased game of the developer or publisher. In the latter two examples, subsequent purchase or registration of the game may result in further zone content being unlocked or downloaded. In any event, further modifications, and timely advert and trailer media, may be downloaded as required.

A similar zone is the commercial zone 1040. Again, there may be a plurality of such commercial zones accessible in similar manner to the developer and publisher zones. Like developer/publisher zones 1030, Commercial zones 1040 may comprise representative virtual assets of one or more commercial vendors in the form of 3D models, textures etc., enabling a rendering of their real-world shops, brands and identities, and these may be geographically and/or thematically grouped within zones.

Space within commercial zones may be rented as so-called 'virtual real-estate' by third parties. For example, a retailer may pay to have a rendering of their shop included within a commercial zone 1040 as part of a periodic update of the Home environment supplied via the Home environment server 2010, for example on a monthly or annual renewal basis. A retailer may additionally pay for the commerce facilities described above, either on a periodic basis or per item. In this way they can provide users of the Home environment with a commercial presence.

Again, the commercial zone comprises supplementary software that can integrate with the home environment via an API, to provide additional communication options (shop-specific names, goods, transaction options etc), and additional functionality, such as accessing an online database of goods and services for purchase, determining current prices, the availability of goods, and delivery options. Such functions may be accessed either via a menu (either as a pop-up or within the Home environment, for example on a wall) or via communication with automated avatars. Communication between avatars is described in more detail later.

It will be appreciated that developers and publishers can also provide stores within commercial zones, and in addition that connecting tunnels between developer/publisher and commercial zones may be provided. For example, a tunnel may link a developer zone to a store that sells the developer's games. Such a tunnel may be of a 'many to one' variety, such that exits from several zones emerge from the same tunnel in-store. In this case, if re-used, typically the tunnel would be arranged to return the user to the previous zone rather than one of the possible others.

In an embodiment of the present invention, the software implementing the Home environment has access to an online-content purchase system provided by the PS3 OS. Developers, publishers and store owners can use this system via an interface to specify the IP address and query text that facilitates their own on-line transaction. Alternatively, the user can allow their PS3 registration details and credit card details to be used directly, such that by selecting a suitably enabled object, game, advert, trailer or movie anywhere within the Home environment, they can select to purchase that item or service. In particular, the Home environment server 2010 can store and optionally validate the user's credit card and other details so that the details are ready to be used in a transaction without the user having to enter them. In this way the Home environment acts as an intermediary in the transaction. Alternatively such details can be stored at the PS3 and validated either by the PS3 or by the Home environment server.

Figure 7:
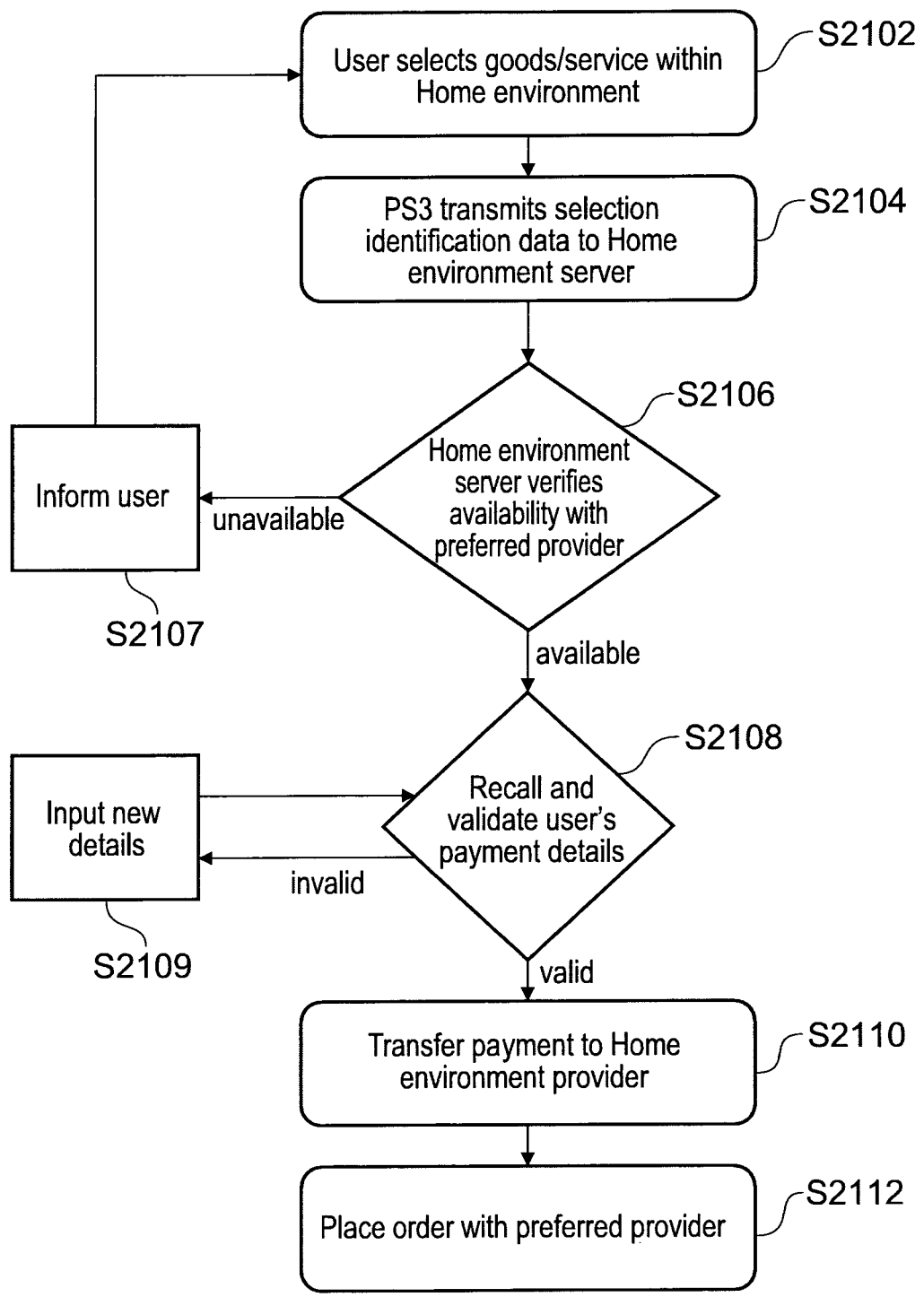
FIG. 7 is a flow diagram of a method of on-line transaction in accordance with an embodiment of the present invention.

Thus, referring now also to FIG. 7, in an embodiment of the present invention a method of sale comprises in a step s2102 a user selecting an item (goods or a service) within the Home environment. In step s2104, the PS3 10 transmits identification data corresponding with the object to the Home environment server 2010, which in step s2016 verifies the item's availability from a preferred provider (preferably within the country corresponding to the IP address of the user). If the item is unavailable then in step s2107 it informs the user by transmitting a message to the user's PS3 10. Alternatively, it first checks for availability from one or more secondary providers, and optionally confirms whether supply from one of these providers is acceptable to the user. In step s2108, the Home environment server retrieves from data storage the user's registered payment details and validates them. If there is no valid payment method available, then the Home environment may request that the user enters new details via a secure (i.e. encrypted) connection. Once a valid payment method is available, then in step s2110 the Home environment server requests from the appropriate third part payment provider a transfer of payment from the user's account. Finally, in step s2112 the Home environment server places an order for the item with the preferred provider, giving the user's delivery address or IP address as applicable, and transferring appropriate payment to the preferred provider's account.

In this way, commerce is not limited specifically to shops. Similarly, it is not necessary for shops to provide their own commerce applications if the preferred provider for goods or services when displayed within a shop is set to be that shop's owner. Where the goods or service may be digitally provided, then optionally it is downloaded from the preferred provider directly or via a Home environment server 2010.

In addition to the above public zones, there are additional zones that are private to the individual user and may only be accessed by them or by invitation from them. These zones also have exits from the communal lobby area, but when entered by the avatar (or chosen via the map screen), load a respective version of the zone that is private to that user.

Figure 8A:
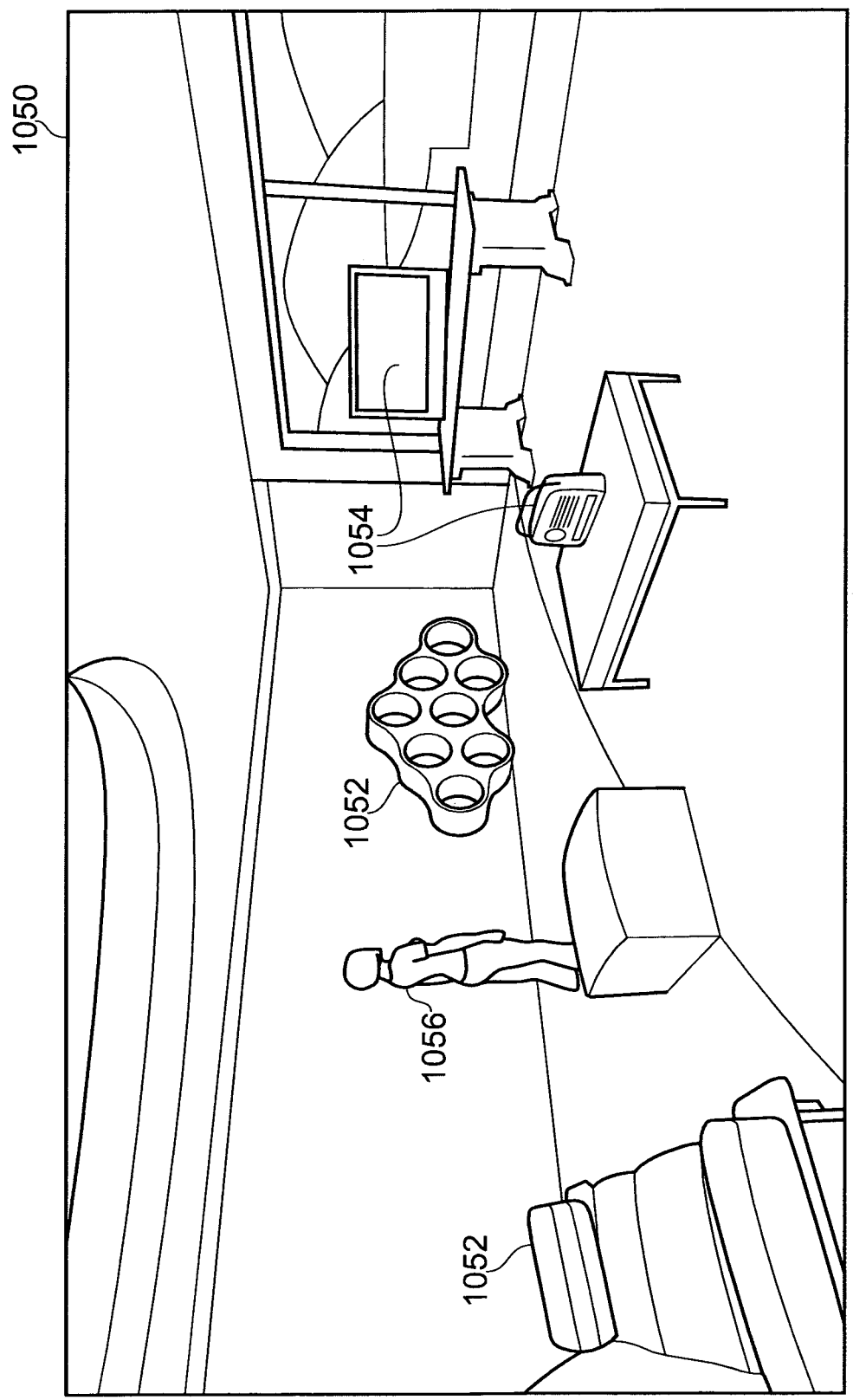
FIG. 8a is schematic diagram of an apartment zone in accordance with an embodiment of the present invention.

Referring to FIG. 8*a*, the first of these zones is an apartment zone 1050. In an embodiment of the present invention, this is a user-customisable zone in which such features 1052 as wallpaper, flooring, pictures, furniture, outside scenery and lighting may be selected and positioned. Some of the furniture is functional furniture 1054, linked to PS3 functionality. For example, a television may be placed in the apartment 1050 on which can be viewed one of several streamed video broadcasts, or media stored on the PS3 HDD 400 or optical disk 440. Similarly, a radio or hi-fi may be selected that contains pre-selected links to interne radio streams. In addition, user artwork or photos may be imported into the room in the form of wall hangings and pictures.

Optionally, the user (represented in FIG. 8*a* by their avatar 1056) may purchase a larger apartment, and/or additional goods such as a larger TV, a pool table, or automated non-player avatars. Other possible items include a gym, swimming pool, or disco area. In these latter cases, additional control software or configuration libraries to provide additional character functionality will integrate with the home environment via the API in a similar fashion to that described for the commercial and developer/publisher zones 1030, 1040 described previously.

Such purchases may be made using credit card details registered with the Home environment server. In return for a payment, the server downloads an authorisation key to unlock the relevant item for use within the user's apartment. Alternatively, the 3D model, textures and any software associated with an item may also be downloaded from the Home environment server or an authorised third-party server, optionally again associated with an authorisation key. The key may, for example, require correspondence with a firmware digital serial number of the PS3 10, thereby preventing unauthorised distribution.

A user's apartment can only be accessed by others upon invitation from the respective user. This invitation can take the form of a standing invitation for particular friends from within a friends list, or in the form of a single-session pass conferred on another user, and only valid whilst that user remains in the current Home environment session. Such invitations may take the form of an association maintained by a Home environment server 2010, or a digital key supplied between PS3 devices on a peer-to-peer basis that enables confirmation of status as an invitee.

In an embodiment of the present invention invited users can only enter the apartment when the apartment's user is present within the apartment, and are automatically returned to the lobby if the apartment's user leaves. Whilst within the apartment, all communication between the parties present (both user and positional data) is purely peer-to-peer.

The apartment thus also provides a user with the opportunity to share home created content such as artwork, slideshows, audio or video with invited guests, and also to interact with friends without potential interference from other users within the public zones.

When invited guests enter a user's apartment, the configuration of the room and the furnishings within it are transmitted in a peer-to-peer fashion between the attendees using ID codes for each object and positional data. Where a room or item are not held in common between the user and a guest, the model, textures and any code required to implement it on the guest's PS3 may also be transmitted, together with a single-use key or similar constraint, such as use only whilst in the user's apartment and whilst the user and guest remain online in this session.

Figure 8B:
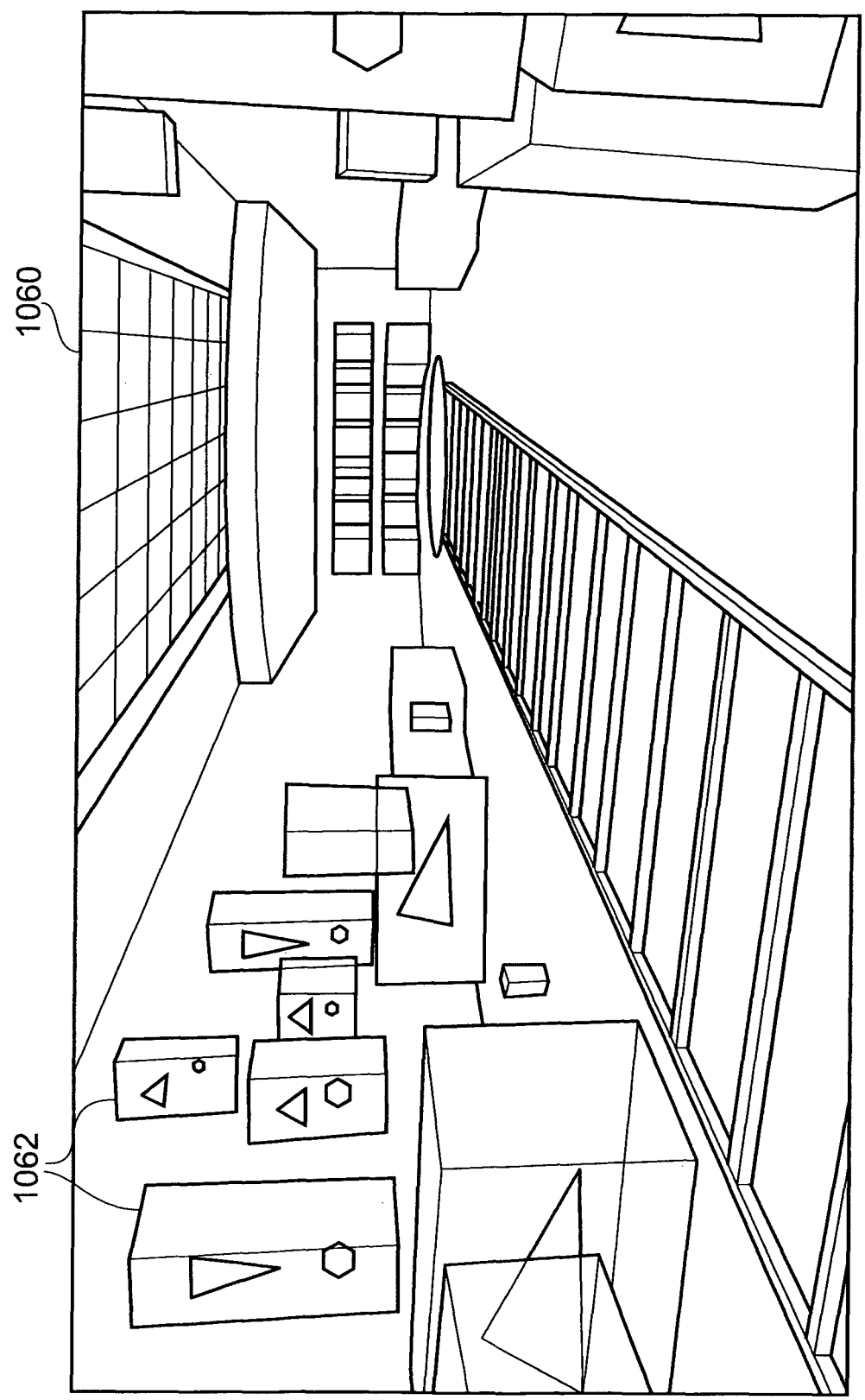
FIG. 8b is schematic diagram of a trophy room zone in accordance with an embodiment of the present invention.

Referring to FIG. 8b, a further private space that may similarly be accessed only by invitation is the user's Trophy Room 1060. The Trophy Room 1060 provides a space within which trophies 1062 earned during game play may be displayed.

For example, a third-party game comprises seeking a magical crystal. If the player succeeds in finding the crystal, the third party game nominates this as a trophy for the Trophy Room 1060, and places a 3D model and texture representative of the crystal in a file area accessed by the Home environment software when loading the Trophy Room 1060. The software implementing the Home environment can then render the crystal as a trophy within the Trophy Room.

When parties are invited to view a user's trophy room, the models and textures required to temporarily view the trophies are sent from the user's PS3 to those of the other parties on a peer-to-peer basis. This may be done as a background activity following the initial invitation, in anticipation of entering the trophy room, or may occur when parties enter a connecting tunnel/anteroom or select the user's trophy room from the map screen. Optionally, where another party also has that trophy, they will not download the corresponding trophy from the user they are visiting. Therefore, in an embodiment of the present invention, each trophy comprises an identifying code.

Alternatively or in addition, a trophy room may be shared between members of a group or so-called 'clan', such that a trophy won by any member of the clan is transmitted to other members of the clan on a peer-to-peer basis. Therefore all members of the clan will see a common set of trophies.

Alternatively or in addition, a user can have a standing invitation to all members of the Home environment, allowing anyone to visit their trophy room. As with the commercial and developer/publisher zones, a plurality of rooms is therefore possible, for example a private, a group-based and a public trophy room. This may be managed either by selection from a pop-up menu or signposts within the Home environment as described previously, or by identifying relevant user by walking up to their avatar, and then selecting to enter their (public) trophy room upon using the trophy room exit from the lobby.

Alternatively or in addition, a public trophy room may be provided. This room may display the trophies of the person in the current instance of the Home environment who has the most trophies or a best overall score according to a trophy value scoring scheme. Alternatively it may be an aggregate trophy room, showing the best, or a selection of, trophies from some or all of the users in that instance of the Home environment, together with the ID of the user. Thus, for example, a user could spot a trophy from a game they are having difficulty with, identify who in the Home environment won it, and then go and talk to them about how they won it. Alternatively, a public trophy room could contain the best trophies across a plurality of Home environments, identifying the best garners within a geographical, age specific or game specific group, or even world wide. Alternatively or in addition, a leader board of the best scoring garners can be provided and updated live.

It will be appreciated that potentially a large number of additional third party zones may become available, each comprising additional 3D models, textures and control software. As a result a significant amount of space on HDD 400 may become occupied by Home environment zones.

Consequently, in an embodiment of the present invention the number of third party zones currently associated with a user's Home environment can be limited. In a first instance, a maximum memory allocation can be used to prevent additional third party zones being added until an existing one is deleted. Alternatively or in addition, third party zones may be limited according to geographical relevance or user interests (declared on registration or subsequently via an interface with the Home environment server 2010), such that only third party zones relevant to the user by these criteria are downloaded. Under such a system, if a new third party zone becomes available, its relevance to the user is evaluated according to the above criteria, and if it is more relevant than at least one of those currently stored, it replaces the currently least relevant third party zone stored on the user's PS3.

Other criteria for relevance may include interests or installed zones of nominated friends, or the relevance of zones to games or other media that have been played on the user's PS3.

Further zones may be admitted according to whether the user explicitly installs them, either by download or by disk.

As noted above, within the Home environment users are represented by avatars. The software implementing the Home environment enables the customisation of a user's avatar from a selection of pre-set options in a similar manner to the customisation of the user's apartment. The user may select gender and skin tone, and customise the facial features and hair by combining available options for each. The user may also select from a wide range of clothing. To support this facility, a wide range of 3D models and textures for avatars are provided. In an embodiment of the present invention, user may import their own textures to display on their clothing. Typically, the parameters defining the appearance of each avatar only occupy around 40 bytes, enabling fast distribution via the home server when joining a populated Home environment.

Each avatar in the home environment can be identified by the user's ID or nickname, displayed in a bubble above the avatar. To limit the proliferation of bubbles, these fade into view when the avatar is close enough that the text it contains could easily be read, or alternatively when the avatar is close enough to interact with and/or is close to the centre of the user's viewpoint.

The avatar is controlled by the user in a conventional third-person gaming manner (e.g. using the game controller 751), allowing them to walk around the Home environment. Some avatar behaviour is contextual; thus for example the option to sit down will only be available when the avatar is close to a seat. Other avatar behaviour is available at all times, such as for example the expression of a selected emotion or gesture, or certain communication options. Avatar actions are determined by use of the game controller 751, either directly for actions such as movement, or by the selection of actions via a pop-up menu, summoned by pressing an appropriate key on the game controller 751.

Options available via such a menu include further modification of the avatar's appearance and clothing, and the selection of emotions, gestures and movements. For example, the user can select that their avatar smiles, waves and jumps up and down when the user sees someone they know in the Home environment.

Users can also communicate with each other via their avatars using text or speech.

To communicate by text, in an embodiment of the present invention, messages appear in pop-up bubbles above the relevant avatar, replacing their name bubble if necessary.

Figure 9:
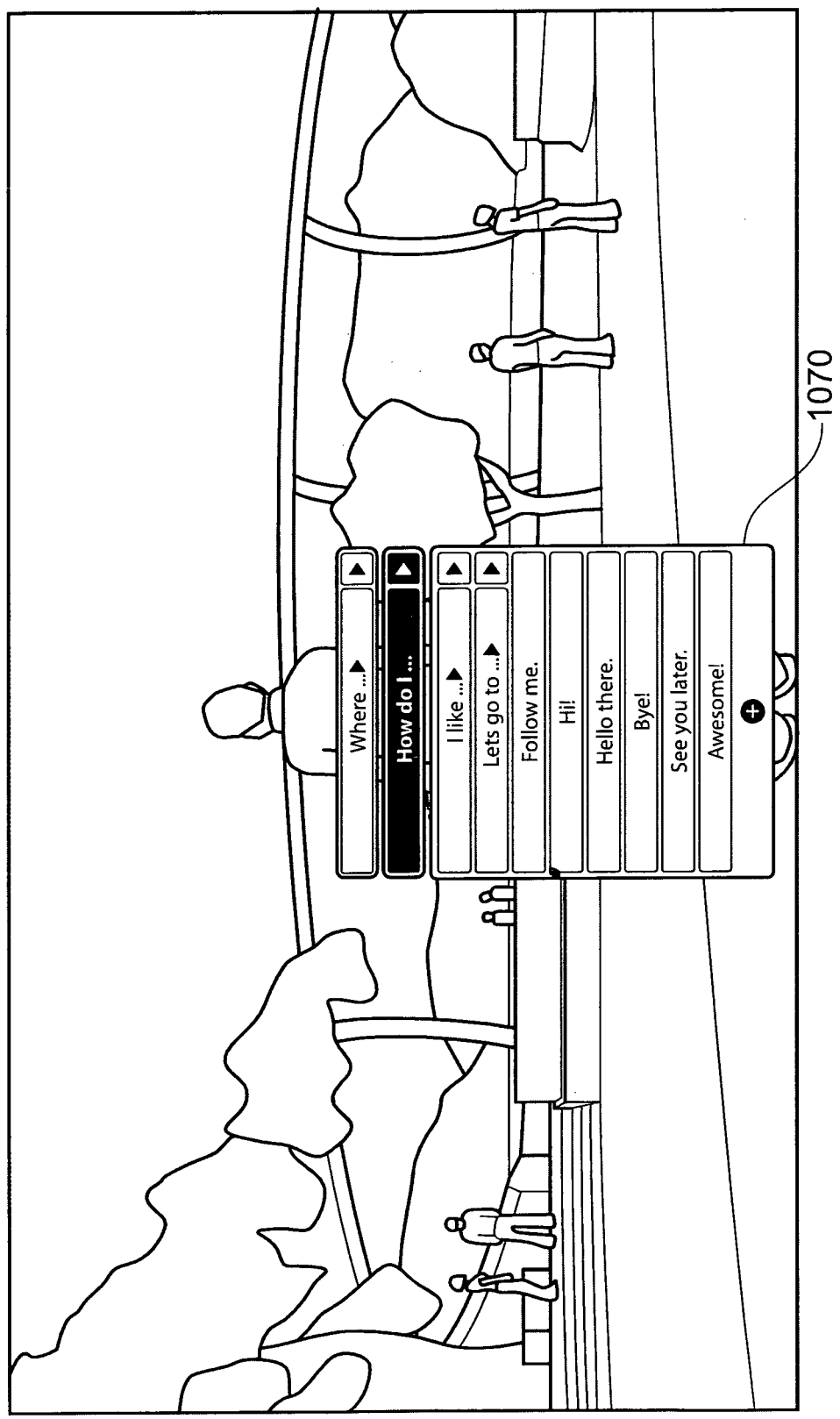
FIG. 9 is a schematic diagram of a communication menu in accordance with an embodiment of the present invention.

Referring now also to FIG. 9, to generate a message the user can activate a pop-up menu 1070 in which a range of preset messages is provided. These may be complete messages, or alternatively or in addition may take the form of nested menus, the navigation of which generates a message by concatenating selected options.

Alternatively or in addition, a virtual keyboard may be displayed, allowing free generation of text by navigation with the game controller 751. If a real keyboard 753 is connected via Bluetooth, then text may by typed into a bubble directly.

In an embodiment of the present invention, the lobby also provides a chat channel hosted by the Home environment server, enabling conventional chat facilities.

To communicate by speech, a user must have a microphone, such as a Bluetooth headset 757, available. Then in an embodiment of the present invention, either by selection of a speech option by pressing a button on the game controller 751, or by use of a voice activity detector within the software implementing the Home environment, the user can speak within the Home environment. When speaking, a speech icon may appear above the head of the avatar for example to alert other users to adjust volume settings if necessary.

The speech is sampled by the user's PS3, encoded using a Code Excited Linear Prediction (CELP) codec (or other known VoIP applicable codec), and transmitted in a peer-to-peer fashion to the eight nearest avatars (optionally provided they are within a preset area within the virtual environment surrounding the user's avatar). Where more than eight other avatars are within the preset area, one or more of the PS3s that received the speech may forward it to other PS3s having respective user avatars within the area that did not receive the speech, in an ad-hoc manner. To co-ordinate this function, in an embodiment of the present invention the PS3 will transmit a speech flag to all PS3s whose avatars are within the present area, enabling them to place a speech icon above the relevant (speaking) avatars head (enabling their user to identify the speaker more easily) and also to notify the PS3s of a transmission. Each PS3 can determine from the relative positions of the avatars which ones will not receive the speech, and can elect to forward the speech to the PS3 of whichever avatar they are closest to within the virtual environment. Alternatively, the PS3s within the area can ping each other, and whichever PS3 has the lowest lag with a PS3 that has not received the speech can elect to forward it.

It will be appreciated that the limitation to eight is exemplary, and the actual number depends upon such factors as the speech compression ratio and the available bandwidth.

In an embodiment of the present invention, such speech can also be relayed to other networks, such as a mobile telephony network, upon specification of a mobile phone number. This may be achieved either by routing the speech via the Home environment server to a gateway server of the mobile network, or by Bluetooth transmission to the user's own mobile phone. In this latter case, the mobile phone may require middleware (e.g. a Java® applet) to interface with the PS3 and route the call.

Thus a user can contact a person on their phone from within the Home environment. In a similar manner, the user can also send a text message to a person on their mobile phone.

In a similar manner to speech, in an embodiment of the present invention users whose PS3s are equipped with a video camera such as the Sony® Eye Toy® video camera can use a video chat mode, for example via a pop-up screen, or via a TV or similar device within the Home environment, such as a Sony® Playstation Portable® (PSP) held by the avatar. In this case video codecs are used in addition to or instead of the audio codecs.

Optionally, the avatars of users with whom you have spoken recently can be highlighted, and those with whom you have spoken most may be highlighted more prominently, for example by an icon next to their name, or a level of glow around their avatar.

Referring back to FIG. 5, when a user selects to activate the Home environment on their PS3 10, the locally stored software generates the graphical representation of the Home environment, and connects to a Home environment server 2010 that assigns the user to one of a plurality of online Home environments 2021, 2022, 2023, 2024. Only four home environments are shown for clarity.

It will be understood that potentially many tens of thousands of users may be online at any one time. Consequently to prevent overcrowding, the Home environment server 2010 will support a large plurality of separate online Home environments. Likewise, there may be many separate Home environment servers, for example in different countries.

Once assigned to a Home environment, a PS3 initially uploads information regarding the appearance of the avatar, and then in an ongoing fashion provides to the Home environment server with positional data for its own avatar, and receives from the Home environment server the positional data of the other avatars within that online Home environment. In practice this positional update is periodic (for example every 2 seconds) to limit bandwidth, so other PS3s must interpolate movement. Such interpolation of character movement is well-known in on-line games. In addition, each update can provide a series of positions, improving the replication of movement (with some lag), or improving the extrapolation of current movement.

In addition the IP addresses of the other PS3s 2131, 2032, 2033 within that Home environment 2024 is shared so that they can transmit other data such as speech in a peer-to-peer fashion between themselves, thereby reducing the required bandwidth of data handled by the Home entertainment server.

To prevent overcrowding within the Home environments, each will support a maximum of, for example, 64 users.

The selection of a Home environment to which a user will be connected can take account of a number of factors, either supplied by the PS3 and/or known to the Home environment server via a registration process. These include but are not limited to:

i. The geographical location of the PS3;
ii. The user's preferred language;
iii. The user's age;
iv. Whether any users within the current user's 'friends list' are in a particular Home environment already;
v. What game disk is currently within the user's PS3;
vi. What games have recently been played on the user's PS3.

Thus, for example, a Swiss teenager may be connected to a Home environment on a Swiss server, with a maximum user age of 16 and a predominant language of French. In another example, a user with a copy of 'Revolution' mounted in their PS3 may be connected to a home environment where a predominant number of other users also currently have the same game mounted, thereby facilitating the organisation of multiplayer games. In this latter case, the PS3 10 detects the game loaded within the BD-Rom 430 and informs the Home environment server 2010. The server then chooses a Home environment accordingly.

In a further example, a user is connected to a Home environment in which three users identified on his friends list can be found. In this latter example, the friends list is a list of user names and optionally IP addresses that have been received from other users that the user given wishes to meet regularly. Where different groups of friends are located on different Home environment servers (e.g. where the current user is the only friend common to both sets) then the user may either be connected to the one with the most friends, or given the option to choose.

Conversely, a user may invite one or more friends to switch between Home environments and join them. In this case, the user can view their friends list via a pop-up menu or from within the Home environment (for example via a screen on the wall or an information booth) and determine who is on-line. The user may then broadcast an invite to their friends, either using a peer-to-peer connection or, if the friend is within a Home environment or the IP address is unknown, via the Home environment server. The friend can then accept or decline the invitation to join.

To facilitate invitation, generally a Home environment server will assign less than the maximum supported number of users to a specific home environment, thereby allowing such additional user-initiated assignments to occur. This so-called 'soft-limit' may, for example, be 90% of capacity, and may be adaptive, for example changing in the early evening or at weekends where people are more likely to meet up with friends on-line.

Where several friends are within the same Home environment, in an embodiment of the present invention the map screen may also highlight those zones in which the friends can currently be found, either by displaying their name on the map or in association with the zone name on the side bar.

Figure 10:
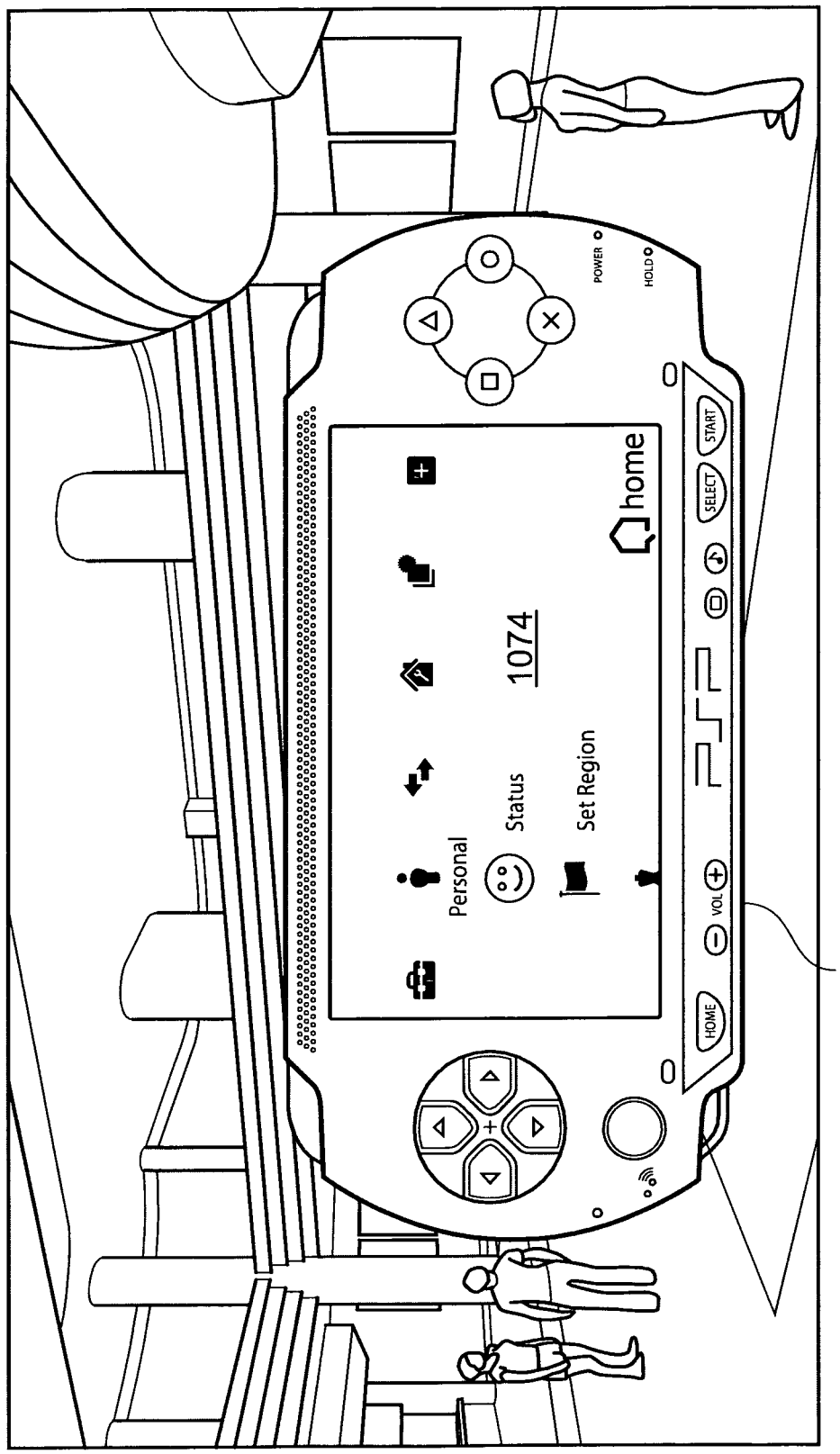
FIG. 10 is a schematic diagram of an interactive virtual user device in accordance with an embodiment of the present invention.

Referring now also to FIG. 10, in addition, preferences, settings, functions of the Home environment and optionally other functionality may be viewed, adjusted or accessed as appropriate by use of a virtual Sony® Playstation Portable® (PSP) entertainment device 1072 that can be summoned by use of the game controller 751 to pop-up on screen. The user can then access these options, settings and functionality via a PSP cross-media bar 1074 displayed on the virtual PSP. As noted above, the PSP could also be used as an interface for video chat.

When a user wishes to leave the Home environment, in embodiments of the present invention they may do so by selection of an appropriate key on the game controller 751, by selection of an exit option from a pop-up menu, by selection of an exit from within the map screen, by selection of an option via their virtual PSP or by walking through a master exit within the lobby zone.

Typically, exiting the Home environment will cause the PS3 10 to return to the PS3 cross media bar.

Finally, it will be appreciated that additional, separate environments based upon the Home environment software and separately accessible from the PS3 cross-media bar are envisaged. For example, a supermarket may provide a free disk upon which a Supermarket environment, supported in similar fashion by the Home environment servers, is provided. Upon selection, the user's avatar can browse displayed goods within a virtual rendition of the supermarket (either as 3D models or textures applied to shelves) and click on them to purchase as described above. In this way retailers can provide and update online shopping facilities for their own user base.

Figure 11:
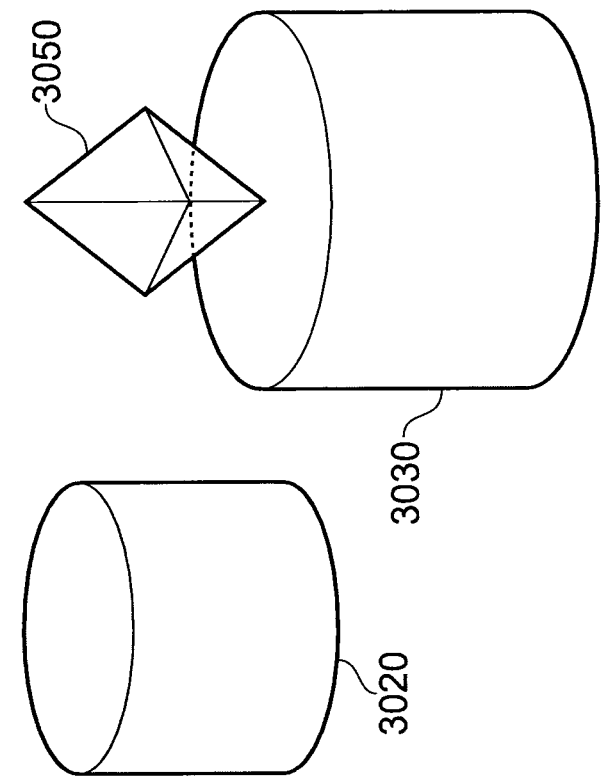
FIG. 11 is a schematic diagram of the placement of trophies within the trophy room in accordance with an embodiment of the present invention.
Figure 11:
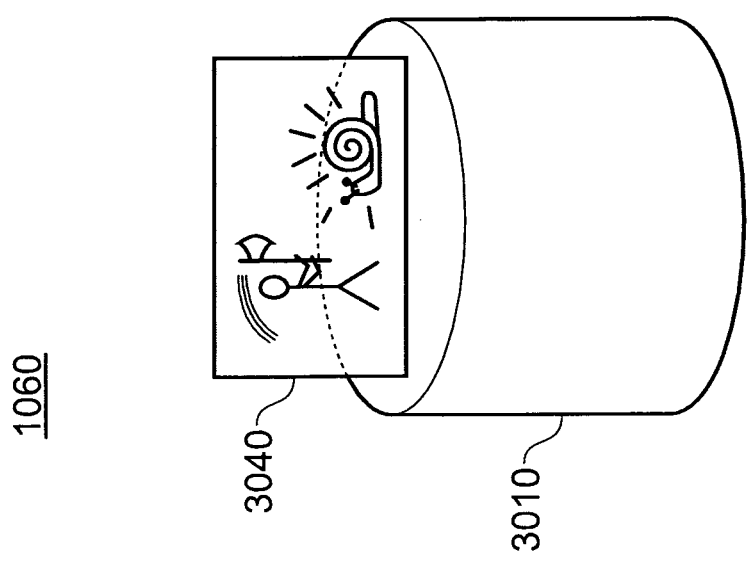

The implementation of the trophy room 1060 will now be described in more detail. FIG. 11 shows a representation of a trophy room according to an embodiment of the present invention. In this example, trophies are displayed on plinths (3010, 3020, 3030) that either form a (virtual) support for the trophy or, if the trophy has not yet been acquired, serve to indicate where a trophy might appear once a user has acquired that trophy. A player acquires a trophy when it is determined that a predetermined game event has occurred. The predetermined game event may (for example) comprise any or all of: a predetermined game score achieved by a game character; a predetermined sequence of moves performed by a game character; successful completion of a game stage; completion of a predetermined game task; and acquisition by a game character of a predetermined game object. However, it will be appreciated that this list is not intended to be limiting and that the predetermined game event may by any suitable game event that is predetermined within the game.

The plinth 3010 shows a multimedia trophy clip 3040 captured during the playing of a third party game. However, it will be appreciated that the relevant game need not be a third party game and could be any game executable on the entertainment device 10. A multimedia trophy clip 3040 comprises, for example, any or all of: captured video of a particularly hard section of the third party game during which a player acquires a trophy; game action that takes place during the playing of a game; and captured audio and/or video of a user or users that are playing the game. The captured audio and/or video is viewed on a virtual screen or associated with the plinth. In an embodiment, the virtual screen may be associated with the plinth. The captured game action may be rendered within the trophy room 1060 by the RSX 200 by itself or associated with the plinth. Replay of the clip may be on an endless repeat basis or may start when a user's avatar approaches or turns towards the virtual screen or on operation of a control.

Here, the game action during the hard section of the third party game may be nominated by the game and the 3D models and textures representative of that action stored in a file area of the PS3 accessible by the Home system. The software implementing the Home environment can then render the relevant action within the trophy room. For example, the multimedia trophy clip 3040 might depict an act of bravery that the player has performed to vanquish an end-of-level monster and thus acquire a trophy. The relevant trophy (not shown) can then be displayed on a plinth alongside its respective trophy movie clip plinth 3010. Alternatively, the multimedia trophy clip 3040 itself can be the trophy. The acquisition of multimedia trophy clips and their display within the trophy room will be described in more detail later.

In the embodiment shown in FIG. 11, the plinth 3020 does not have a trophy displayed above it as the user has yet to acquire enough trophies to fill the trophy room 1060. Alternatively, plinths can be automatically generated by the processor 100 and appropriately placed within the trophy room 1060 if and when a user acquires a trophy. Additionally, the plinths can be placed or grouped together within the trophy room 1060 according to the types of trophy they display or the particular 3rd party game from which the trophies originate. In order to prevent a size mismatch between the trophy and the plinth, the processor 100 is operable to scale the plinth to the size of the trophy. The processor first determines the size of the trophy and then carries out the necessary 3D transformations (e.g. scaling) to the plinth using techniques well known in the art.

The plinth 3030 shows a 3D representation of a trophy 3050 that a user has acquired whilst playing a third party game. The trophy can be rendered by the RSX 200 as a solid object within the trophy room or the RSX 200 may perform alpha blending between the trophy and the background so as to impart an ethereal (partially transparent) quality to the trophy. Additionally, the RSX 200 can render the trophy such that the aspect presented to the viewing avatar changes over time. For example, the magical crystal trophy 3050 could be rendered such that it is seen to rotate in front of the avatar so as present differing facets to the viewer.

It will be appreciated that the trophies need not be displayed on plinths. For example, they may be displayed in virtual display cabinets or within floating cages or translucent vaults that denote particularly valuable or difficult to acquire trophies. Additionally, trophies may be displayed in recesses in the walls of the trophy room 1060 or the display cabinets may be distributed around the perimeter of the trophy room 1060. Optionally, where a trophy comprises an image of a vanquished monster or enemy, the monster or enemy can be shown shackled to the plinth or trapped in a cage. Alternatively, the trophies may be rendered directly within the trophy room 1060 without reference to a relevant presentation feature such as a plinth.

A further aspect of the trophy room 1060 is that the plinths can be customised by the user using an option menu. For example, a user can change the colour of the plinth and add text or comments to the plinth. Additionally, the user can reposition plinths within the trophy room 1060 using the game controller 751.

To facilitate organisation of the trophies within the trophy room 1060, the processor 100 compiles and maintains a record of all the trophies displayed within the trophy room 1060. This record is stored on the HDD 400 in a file space that is accessible by the software that is executing the Home environment. Therefore, a list of trophies or game card of trophies that a user has acquired can be displayed. The game card may comprise information such as trophy name or a scaled view or icon of each trophy. The scaling of trophies will be described in more detail below. Optionally, each trophy on the list can be rendered either in 2D or 3D.

As described above, certain trophies may be more difficult to acquire than other trophies. Accordingly, each trophy can have a excellence score associated with it (and set by the device with reference to the game in which the trophy was acquired) that depends upon the difficulty of acquiring that trophy. The excellence score is thus indicative of a value that the trophy has to the user. The processor 100 can then sum the excellence scores of each of the trophies within the trophy room 1060 so as to create a total excellence score that gives an overall indication of a user's skill. The total excellence score may then be used to rank different players of the third party game. The RSX 200 can then render and display a rank list of users who have played that game such as a leader board. An example of the rank list of users is shown in Table 1 below. The processor 100 can also use the total excellence score to make skill comparisons between different users. Additionally, trophies may be rendered at different positions in the trophy room according to their excellence score.

TABLE 1

| Player Name | Total excellence score | Skill level |
| --- | --- | --- |
| Player B | 845 | High |
| Player C | 343 | |
| Player D | 24 | |
| Player A | 1 | Low |

The transmission of trophies between a third party game to the trophy room 1060 of the Home system will now be described in more detail.

FIG. 12 shows a schematic representation of a file format of an embodiment of the present invention that is used to transfer 3D graphics information between a third party game and the trophy room 1060 of the Home environment. The 3D graphics file 3100 comprises a header 3110 and 3D graphics data 3120.

The header 3110 contains data about the contents of the file and the file format used to create the 3D graphics. For example, third party games could generate 3D graphics using OpenGL® or Direct3D® formats. Alternatively, an interchange file format for interactive 3D applications (e.g. the COLLADA® format) can be used by the third party game to generate 3D graphics which can be rendered directly in the Home environment by the RSX 200 of the PS3 device.

The 3D graphics data 3120 of FIG. 12 comprises data about how to draw and render the 3D graphics that relate to the acquired trophy. The 3D graphics data includes data relating to mesh geometry (vertices and polygon formation etc.), transform hierarchy (rotation, translation, shear and scaling etc.), effects, shading, textures, physics (e.g. rigid bodies, constraints, rag doll models, and collision volumes), and animation data.

As described above, trophies are generated in third party games when a user obtains a particular object, achieves a certain score, successfully performs a difficult task and the like. Accordingly, the third party game generates a 3D graphics file 3100 and saves it in a file area that may be accessed by the software that implements the Home environment. Here, the header data 3110 may include metadata about the type of trophy or trophy name, date and time the trophy was acquired and similar attributes that will help the user or the software implementing the Home environment to identify that trophy such as a unique ID code. This metadata can be displayed next to the relevant trophy in the trophy room 1060. In the case of a public trophy room, the name of the user that acquired that trophy can also be displayed next to the trophy within the public trophy room so as to identify the trophy as theirs. As described above, the header 3110 may comprise a unique ID code that serves to identify the trophy so that, on visiting the trophy room 1060, the PS3® of another user who also has that trophy can render the relevant 3D graphics from data stored locally and does not need to download the corresponding trophy from the machine of the user they are visiting. In an embodiment, the processor is operable to detect whether the trophy held on another user's machine is the same as that held on the user's machine by carrying out a comparison between the respective unique ID codes.

The third party game saves the 3D graphics file to a storage device such as the hard disk drive 400 or to a "Memory Stick®" or memory card inserted by the user in the memory card reader 450. Preferably, the 3D graphics file is stored on the hard disk drive 400 so as to facilitate fast access to the 3D graphics data.

It will be appreciated that the 3D graphics generated by the third party game may need to be scaled so as to allow them to be displayed in the trophy room 1060 without, for example, obscuring other trophies. In an embodiment of the present invention, this is accomplished by applying a scaling transformation to the stored 3D model of the trophy before the trophy is rendered in the trophy room 1060. However, it will be appreciated that any appropriate scaling method may be used and the trophy could be scaled before storing in the storage means. According to an embodiment of the present invention, the scaling is accomplished by reducing the number of polygons that create the 3D mesh of the trophy as shown in FIGS. 13a and 13b.

FIG. 13a shows a collection of polygons that may be used to form part of the trophy to be rendered. Here, textures are mapped onto the polygons so as to create the 3D image to be displayed. The polygons shown in FIG. 13a represent a higher level of detail that than shown in FIG. 13b. In other words, FIG. 13a corresponds to high resolution image data relating to a high resolution version of the trophy, whilst FIG. 13b corresponds to low resolution image data relating to a low resolution version of the trophy.

For example, the level of detail shown in FIG. 13a is used when the avatar is within a predetermined distance of the trophy within the trophy room 1060. When the processor 100 determines that the avatar is further away from the trophy than the predetermined distance, the trophy need not be rendered in as much detail as that shown in FIG. 13a and instead the level of detail shown in FIG. 13b which uses fewer polygons to render the image is used. Therefore, the trophy will require fewer pixels to be calculated during the rendering process. The polygons that are used for the lower resolution image shown in FIG. 13b have substantially the same shape and vertex points as the higher resolution image of FIG. 13a.

The use of different levels of detail as shown in FIGS. 13a and 13b can advantageously be used to reduce the amount of data that needs to be transferred on a peer-to-peer basis between users or server-client basis when a user enters a trophy room of another user. On entry into the trophy room 1060, a user's avatar is likely to be some distance from some or all of the trophies within the trophy room 1060. Therefore, the lower level of detail is initially used to render the trophies so that the amount of data that needs to be downloaded before a user can view all the trophies is reduced. As the user's avatar moves around the trophy room data transfer of higher detail rendering models of the trophies continues as a background process so that after some elapsed time, all the higher detail models will have been downloaded to that user's PS3® device. Optionally, the download order of the higher detail rendering models is prioritised according to the position of the user's avatar with respect to the relevant trophy as detected by the cell processor. For example, higher detail image data of the trophy or trophies closest to the avatar is downloaded first. It will be appreciated that other prioritising schemes could be used such as prioritising download according to a line of sight or with respect to the rendering complexity of each trophy.

Alternatively, the higher level of detail is not downloaded until a user's avatar approaches within a first predetermined distance of the trophy. To achieve this, the cell processor detects whether the distance between the user's avatar and the trophy is less than the first predetermined distance. If the distance between the user's avatar and the trophy is detected as being less than the predetermined distance, then the high resolution image data is downloaded and received from another entertainment device.

Then, on approaching closer to the relevant trophy, when the avatar comes within a second predetermined distance of the trophy the higher level of detail is used to render the trophy. The cell processor detects whether the distance between the user's avatar and the trophy is less than the second predetermined distance. If the detected distance is less than the second predetermined distance, then the received high resolution image data is used to render the trophy.

Therefore, if the position of the user's avatar does not come within the first predetermined distance, the higher detail image need never be downloaded and bandwidth costs are reduced.

Additionally, a lower resolution texture may also be mapped onto the polygons. Therefore, bandwidth can be reduced either by reducing the number of polygons used to render the trophy, mapping a lower resolution texture onto the polygons, or a combination of both. Optionally, the image may be rendered at the higher resolution regardless of the position of the avatar with respect to the trophy.

To further prevent the trophy room 1060 becoming cluttered with trophies, optionally, smaller trophies may be amalgamated or upgraded to form a single larger trophy. This can happen when, for example, a predetermined number of trophies having a particular excellence score are acquired by the user. Alternatively, trophies may be linked as a group to other trophies. This is accomplished by including within the header 3110 linking data that indicates the association between the trophies. For example, all trophies that are acquired from a particular third party game may be linked.

In an embodiment, the HDD 400 is operable to store at least one trophy group representation of a group of trophies such as those trophies having a predetermined score as mentioned above. The trophy group representation is associated with the group of trophies having the predetermined score so that the trophies in the group may be represented by the trophy group representation rather than being displayed individually.

To display a trophy group representation, the processor 100 detects whether each trophy in the trophy group is stored in the HDD 400. If all the trophies in the group are stored in the HDD 400, then the RSX 200 renders the trophy group representation as a trophy group object in the trophy room. However, if the processor detects that not all of the trophies in the trophy group are stored in the HDD 400, then the trophy group representation is not rendered by the RSX 200. Instead, the trophies may be rendered individually. This provides an incentive for a player to acquire all the trophies in the trophy group.

According to an embodiment of the present invention, a reduced size image or other representation (e.g. a medal) of the trophy can be rendered so that it appears to be part of the clothing of the avatar of a user that has acquired that particular trophy. Optionally, each trophy may have an associated score and the sum total of scores of trophies within a particular trophy room can be displayed on the avatar associated with that trophy room or within the trophy room itself, for example as a score board or banner.

Furthermore, if so desired by a user, the software implementing the Home environment is also operable to render particular trophies within the user's apartment zone 1050. This function could be seen to be analogous to placing a trophy on a mantelpiece within the user's real living room. The trophies to be rendered may either be selected by the user or directly linked so as to correlate with those displayed in the trophy room 1060. However, it will be realised that, in the case of a highly competent or successful user, there may be too many trophies to display in their apartment. In this case, only highly valuable or difficult to obtain trophies as indicated by their excellence score are associated between the trophy room 1060 and the user's apartment zone 1050. Alternatively, a generic "Trophy Cup" may be displayed in the user's apartment zone that only displays a trophy when prompted to do so by the user.

According to another embodiment of the invention, a user may elect to send an image of an acquired trophy to their own mobile phone or to brag about the acquisition of that trophy to their friends by sending an image of the trophy to their friend's mobile phone.

In the case where a user wishes to store an image of the trophy on their mobile phone, the image is transferred via the Bluetooth® wireless link port 740 to the user's mobile phone. Before, sending the image of the trophy to the user's phone, the processor 100 may scale the image as described above so as to reduce the resolution so that it is suitable for display on a mobile phone. Alternatively, the processor 100 may create a 2D representation of the trophy so as to reduce the file size of the image and instruct the Bluetooth® link 740 to send that image to the user's phone.

Once on the user's phone, the user may elect to send the image of the trophy to a friend via the Multimedia Messaging Service (MMS) so as to brag about their accomplishments. Alternatively, the user's mobile phone comprises a middleware applet that is operable, on reception of an image via the Bluetooth® link 740 and when instructed by the system unit 10, to send an image via MMS to a mobile telephone that is specified by a user within the Home environment. Optionally, the image may be sent to a mobile phone using MMS via a gateway server that is linked to a mobile telecommunications network. Here, the user specifies the telephone number or address of a friend's mobile phone from within the Home environment and the software that is executing the Home environment sends an image of the trophy to the gateway server directly as an MMS.

Alternatively, images of the trophies could be emailed to other users, either from within the Home environment or from their mobile phone.

Figure 14:
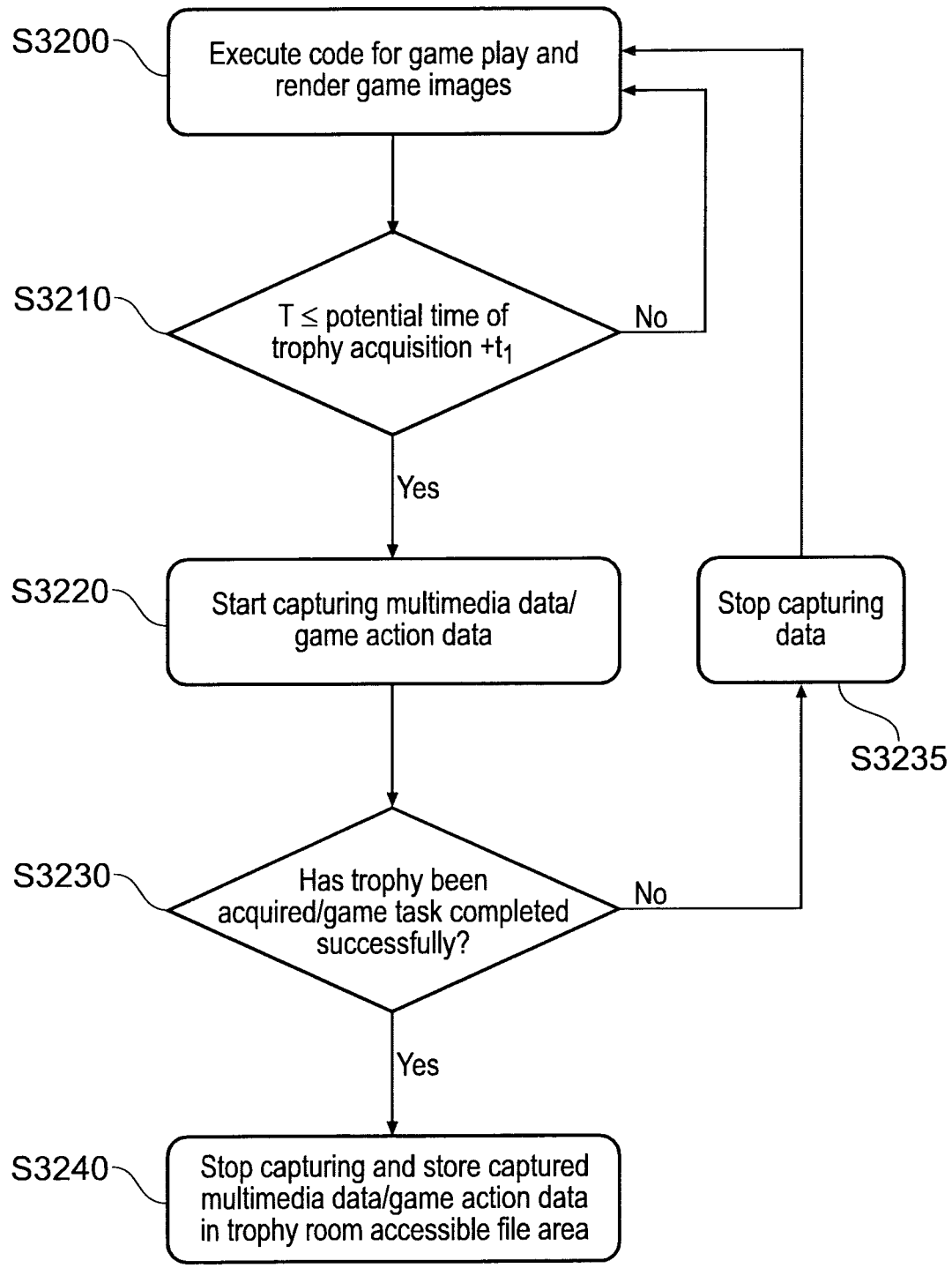
FIG. 14 is a flow diagram of a method of capturing multimedia clips in accordance with embodiments of the present invention.

The acquisition of multimedia trophy clips and their display within the trophy room will now be described with reference to FIG. 14 which shows a flow chart of a capture process used to acquire multimedia data that relate to the acquisition of a trophy by a user.

At a step s3200, the processor 100 executes game code for implementing game play and the RSX 200 renders game images for display to a user playing the game. Here, 'execute' is taken to mean an ongoing process rather than an initial prompt to start game play.

At a step s3210, the processor 100 determines if the game play has reached a point at which a user is likely to obtain a particular object, achieve a certain score, successfully perform a difficult task and the like. This is determined by looking to see if the current time T is less than or equal to a potential time of trophy acquisition plus a constant $t_1$. Here, the constant $t_1$ is used to define a time window before the acquisition of the trophy during which multimedia data capture or game action capture would be of interest to the user; for example, $t_1$ could be set to be 30 seconds thus allowing any particularly cunning moves or novel actions performed by a game character leading up to acquisition of the relevant trophy to be captured by the system. The time of potential trophy acquisition can be predefined within the program code so as to reduce the processing resources needed to look ahead in the game and find potential points within the game at which trophies may be acquired. Optionally, the game may comprise flags that denote sections of game play that are of interest such as a particularly intransigent monster or a potentially difficult shot in a shooting game that leads to the acquisition of a trophy. If the processor determines that the game play is within a time period of interest, the process proceeds to a step s3220. However, if it is determined that the game play is not within a time window where a trophy might be acquired, execution of the game caries on as before at step s3200.

At a step s3220, the PPE 150 of the processor 100 instructs at least one of the SPEs 110A-H to start capturing live video and/or audio of the game play and saving the captured stream of data to a temporary file space on the HDD 400 or other storage medium such as a compact flash memory card inserted in the memory card reader 450. For example, the video and/or audio data of the game play may be captured as a Universal Media Disk® (UMD) data stream, a BINK® data stream, or a Motion Pictures Expert Group 4 (MPEG 4) multimedia data stream although any suitable codec may be used. This method allows the software that is executing the Home environment to replay the game action later without having to have knowledge about the game engine that is being used to execute that particular third party game.

However, in the case where the software that executes the Home environment does hold information about the particular game engine used for a particular game, game actions within that game engine can be captured directly by the SPE and temporarily stored as described above. A list of games whose games engines are compatible with the Home system is stored on the HDD 400. When the game is loaded, the processor 100 checks the game against the record of compatible games stored on the HDD 400 to see if the loaded game can output game actions in a format that can be recognised by the Home system. If so, then an option may be presented to the user to select which form of game capture should be used to capture the multimedia content. However, as displaying game actions captured directly from the game as trophies within the trophy room is computationally more intensive than capturing audio and video data streams, if no selection by the user is made, multimedia (video and/or audio) data is captured by default.

At a step s3230, the processor 100 determines whether or not the user has acquired the relevant trophy or successfully completed the relevant game task. If they have not succeeded in their task or failed to acquire the relevant trophy, acquisition of the game action or multimedia data is stopped (s3235) and the relevant data that was temporarily stored on the hard disk drive 400 is deleted. The game play then continues as before at step s3200.

If the user has successfully completed the game task or acquired the trophy, capturing of that particular game event stops (s3240) and the processor 100 adds header data and moves the captured multimedia/game action data (with its header data) from the temporary file space on the HDD 400 to a file space on the HDD 400 allocated to the storage of trophies to be displayed within the trophy room 1060. Therefore, when a user enters the trophy room 1060, this file space is accessed by the processor 100, and the multimedia content rendered as a trophy within the trophy room as described above.

In an alternative embodiment, video and/or audio capture is performed continuously throughout the playing of the game and the captured data is stored in the temporary file space on the HDD 400. In this case, the processor 100 keeps a record of periods of the game during which a trophy was acquired or whether a difficult level was completed (hereafter 'exciting sections') and stores this tagging data within a separate temporary file space on the HDD 400. On completion of game play, the processor 100 correlates the record of exciting sections against the captured multimedia data. Those sections of the captured data that are identified or tagged as 'exciting sections' have header data added and are then moved to the file space on the hard disk drive that is allocated to trophies to be displayed in the trophy room 1060. The processor 100 is also operable to incorporate the unique ID code into the header data of the tagged multimedia data and generate automated captions for display in the trophy room 1060. The automated captions may be built into the game or may be generated using metadata content extraction tools well known in the art. The rest of the captured data is then deleted from the hard drive 400 so as to free up storage space.

Additionally, in the case where there are multiple online players of a game each acquiring the same trophy at the same exciting section of a game, the generated metadata may be used to classify the captured game action as to the quality of the game action. Those captured sections that are deemed to be particularly note-worthy can be uploaded via the Ethernet port 720 or the WiFi port 730 to a home entertainment centre or server. The determination of note-worthy captured sections can be carried out by a processor in the home entertainment device of server in dependence upon the generated metadata. For example, captured game action that has a particularly high level of movement may be nominated as 'note-worthy'. The necessary qualities of a note-worthy section may be predefined or may be generated by the processor of the home entertainment device or server using predefined parameters. Alternatively, a user or users may nominate a captured exciting section as note-worthy or a user in charge of the server may determine the note-worthy sections. Consequently, the uploaded action can be used to form a television program or a highlights feature showcasing that game action for viewing by a user.

The playback of multimedia trophy clips within the trophy room will now be described.

When a multimedia trophy clip 3040 is played back within the trophy room 1060, the multimedia trophy clip 3040 may be displayed in a variety of ways; for example, when the multimedia trophy clip 3040 comprises captured multimedia data such as video and audio data, the video data may be displayed on a virtual flat screen floating above a plinth 3010. The video can be displayed within a frame or the transparency of the edges of the video may be alpha-blended with the background so as to feather the outline of the video. Alternatively, the video outline is sharply delineated but no frame is added when rendering the video data using the RSX 200.

In order that a user may simultaneously view several video clips within the trophy room, a rotational transform is applied to the clip such that the virtual plane of the video clip is parallel with the viewing screen of a display device used to display the Home environment to the user. It will be appreciated that other rotational transforms may be applied to the video clip; for example, the virtual plane of the video clip could be rotated so that a vector normal to that plane is directed towards the position of the user's avatar within the trophy room 1060. Optionally, the orientation of the video clip within the trophy room 1060 may be fixed or made to rotate with respect to time. Alternatively, the multimedia trophy clips can be shown on virtual screens on the walls of the trophy room 1060.

In the case where the multimedia trophy clip comprises game action, the view or aspect of the game action can be fixed with respect to a particular feature of the trophy room 1060 or the projection of the trophy room onto the display screen. When the game action is fixed with respect to a particular feature of the trophy room such as the corridor from an adjacent area, a user can control their avatar to move around the game action and view it from different angles. To enable this, the software executing the Home environment has knowledge of the games engine used to create the game action of the trophy clip and uses the data stored in the trophy room accessible file space to render the game action within the trophy room 1060. Alternatively, the game action can rotate about any virtual axis with respect to time but preferably about an axis normal to the floor of the trophy room 1060. Additionally, the processor 100 can apply scalar and rotational transformations to the game action so that the same aspect of the game action is presented to the avatar. This reduces a processing burden on the processor 100 and the RSX 200 as only one virtual point of view needs to be calculated and rendered. A computationally simple transformation may then be applied such that the same aspect of the game action is always presented to the viewer or the user's avatar.

As described above, a multimedia trophy clip 3040 may comprise only captured video of a particularly hard section of a game during which a player acquires a trophy. Optionally, the multimedia trophy clip 3040 only comprises audio data or comprises both audio and video data. To prevent a ghastly cacophony arising from the simultaneous playback of many multimedia trophy clips comprising audio when a user's avatar enters the trophy room 1060, a threshold is applied so that audio is only played back when the user's avatar is within a certain distance of the trophy within the trophy room 1060. To achieve this, the processor detects a virtual distance between the trophy and the avatar. If the detected distance is less than a predetermined distance, then the processor triggers playback of the multimedia trophy clip 3040.

Alternatively, the processor is operable to modulate the volume of the audio playback in dependence upon the virtual distance between the user's avatar and the multimedia trophy clip 3040.

A similar playback method may be applied as described above so as to reduce processing loads on the RSX 200 when rendering and displaying many different multimedia trophy clips comprising video data especially those that, from certain viewpoints, may be alpha blended with other video clips. Optionally, the playback of a multimedia trophy clip may be instigated when a user's avatar presses a virtual "playback button" situated on or near the plinth of the relevant trophy or when the user executes a playback command using the game controller 751.

According to a further embodiment of the invention, the system unit 10 is operable to capture audio and/or video of a user or users playing the game for display within the trophy room 1060 or elsewhere within the Home environment such as the user's apartment zone 1050. The capture of video is performed using the video camera 756 and capture of audio is performed using the microphone(s) built into the video camera 756 and/or the microphone headset 757.

Video and/or audio may be captured during moments of the game during which a player acquires a trophy. For example, whilst slaying an end-of level monster within a game, a player might utter the phrase "Take that, you nefarious evil-doer!", or when shot by another player within a shooting game, a player might cry "Oh no! You've ruined my favourite purple scarf". If these events are indicated by the processor 100 to coincide with points at which a trophy acquisition occurred, these phrases are captured by the processor 100 using the microphone headset 756 and/or the microphone(s) built into the video camera 756 according to substantially the same multimedia capture method as described above with reference to FIG. 14. Alternatively, audio and/or video of the user or users may be captured continuously and the relevant portions selected by the processor 100 and saved into the file area accessible by the software executing the Home environment as described above. Optionally, a user may user the game controller 751 to indicate which points of the game they would like captured and stored as trophies or points of note. With the permission of the other relevant user(s), the recorded material can represent the reactions of the vanquished player rather than the player winning the trophy.

As an example of video capture of a user playing the game, when the processor 100 determines that an 'exciting section' is about to be reached as described above, the processor starts capturing video from the video camera 756. For example, any grimaces or intent looks of concentration on the part of the user are captured by the video camera and, if the user successfully acquires the trophy, that captured footage is stored on the HDD 400 or other storage means. The captured video footage can then be displayed in the trophy room 1060 as a trophy in itself or in combination with the relevant trophy and/or captured game action or captured audio/video from within the game to which it applies.

As noted above, a user may elect to send an image of a trophy to friend's mobile telephone. According to an embodiment of the invention, a user may also send multimedia trophy clips to a mobile telephone. The multimedia content can be sent via MMS or any other suitable protocol. Additionally, the multimedia content can be compressed by the processor 100 before sending using a suitable algorithm. Alternatively, if there is sufficient bandwidth, the multimedia content need not be compressed.

It will be appreciated that in embodiments of the present invention, elements of the entertainment method may be implemented in the entertainment device in any suitable manner. Thus adapting existing parts of a conventional entertainment device may comprise for example reprogramming of one or more processors therein. As such the required adaptation may be implemented in the form of a computer program product comprising processor-implementable instructions stored on a data carrier such as a floppy disk, optical disk, hard disk, PROM, RAM, flash memory or any combination of these or other storage media, or transmitted via data signals on a network such as an Ethernet, a wireless network, the internet, or any combination of these or other networks.

It will be appreciated that the entertainment devices may communicate with each other over a network using a peer-to-peer communication protocol. Alternatively, the network may comprise a network server and the entertainment devices may communicate with each other using the server. It will be appreciated that the entertainment devices may communicate with each other using both a peer-to-peer communication protocol and via the network server.

It will be appreciated that the term "entertainment device" can encompass various types of data processing apparatus, and not just dedicated games machines.

The invention claimed is:

1. An entertainment device comprising one or more processors configure to:
   detect whether a representation of a game feature of a game associated with the entertainment device and executed at the entertainment device using game software stored locally at the entertainment device should be obtained from the game in response to a predetermined game event of the game;
   obtain the representation of the game feature from the game; store the representation of the game feature obtained from the game in a storage arrangement;
   render the obtained representation of the game feature stored in the storage arrangement as a game feature within a virtual environment associated with the entertainment device, the virtual environment being an on-line virtual environment viewable by multiple on-line users and operable to display representations of game features relating to a plurality of the on-line users, the rendered game feature within the virtual environment being a trophy object in which the game associated with the entertainment device and from which the representation of the game feature may be obtained is different from the virtual environment associated with the entertainment device; and
   receive the representation of the game feature from a second entertainment device,
   in which:
   the representation of the game feature available for reception from the second entertainment device comprises high resolution image data relating to a high resolution version of the trophy object, and low resolution image data relating to a low resolution version of the trophy object,
   the one or more processors are operable to selectively receive either or both of the low resolution image data and the high resolution image data from the second entertainment device in dependence upon a position of the trophy object with respect to a three-dimensional avatar representation of a game character associated with a user, and
   the one or more processors are further operable to render the trophy object using either the low resolution image data or the high resolution image data received from the second entertainment device in dependence upon a detected position of the three-dimensional avatar representation with respect to the trophy object.

2. A device according to claim 1, in which the representation of the game feature of the game is a virtual three dimensional representation of a game object and the trophy object is a virtual three dimensional representation of that game object.

3. A device according to claim 2, in which the trophy object comprises a three dimensional mesh and the renderer is operable to render a texture onto the mesh of the trophy object.

4. A device according to claim 2, in which the one or more processors are operable to apply a scalar transformation to the trophy object.

5. A device according to claim 4, in which the three dimensional mesh comprises a plurality of polygons, and the one or more processors are operable to perform the scalar transformation by manipulating the number of polygons that are used to render the trophy object.

6. A device according to claim 2, in which the one or more processors are operable to render a virtual three dimensional avatar representation of a game character within the virtual environment.

7. A device according to claim 6, in which the one or more processors are operable to apply a rotational transformation to the trophy object such that substantially the same visual aspect of the trophy object is displayed with respect to any one of:
   a predetermined position within the virtual environment;
   a virtual position of the game character within the virtual environment; and
   a virtual camera position from which a user views the virtual environment.

8. A device according to claim 2, in which the one or more processors are operable to apply a rotational transformation to the trophy object such that the trophy object rotates about a predetermined axis within the virtual environment with respect to time.

9. A device according to claim 2, in which:
the storage arrangement is operable to store at least one trophy group representation associated with a group of trophy objects;
the one or more processors are operable to detect whether each trophy object of the group of trophy objects is stored in the storage arrangement; and
the one or more processors are operable to render the trophy group representation as a trophy group object within the virtual environment if the one or more processors detect that each trophy object of the group of trophy objects is stored in the storage arrangement and the one or more processors do not render the trophy group object within the virtual environment if the processor detects that not all trophy objects within that group of trophy objects are stored in the storage arrangement.

10. A device according to claim 1, in which the representation of the game feature comprises a media item and the trophy object comprises that media item.

11. A device according to claim 10, in which the one or more processors are operable to implement software associated with the game.

12. A device according to claim 11, in which the one or more processors are operable to obtain the media item from media data generated by software associated with the game.

13. A device according to claim 11, in which the one or more processors a operable to:
implement software associated with the game;
generate media data; and
obtain the media item from the media data generated by the one or more processors,
in which the media data generated by the one or more processors is data that is generated using program code that is different from the software associated with the game.

14. A device according to claim 10, in which the one or more processors are operable to obtain the media item from a media input device.

15. A device according to claim 14, in which the media input device comprises a video camera and/or a microphone.

16. A device according to claim 10, in which the media item comprises video material.

17. A device according to claim 10, in which the media item comprises game action data indicative of game features and/or game character actions performed within the game.

18. A device according to claim 10, in which the media item comprises audio material.

19. A device according to claim 10, in which the media item comprises audio material and video material.

20. A device according to claim 19, in which the one or more processors are operable to render the virtual three-dimensional avatar representation of the game character within the virtual environment.

21. A device according to claim 20, in which the one or more processors are operable to perform a rotational transformation to the media item of the trophy object such that substantially the same visual aspect of the trophy object is displayed to a user with respect to any one of:
a predetermined position within the virtual environment;
a virtual position of the game character within the virtual environment; and
a virtual camera position from which a user views the virtual environment.

22. A device according to claim 20, in which the one or more processors are operable to:
detect a virtual distance between the trophy object and the three dimensional avatar representation of the game character associated with the user; and
selectively trigger playback of the media item,
in which the one or more processors trigger the playback of the media item in response to the virtual distance between the trophy object and the avatar representation of the game character becoming less than a predetermined virtual distance.

23. A device according to claim 10, in which the one or more processors are operable to trigger playback of the media item in dependence upon an action performed by the three dimensional avatar representation of the game character within the virtual environment.

24. A device according to claim 10, in which the one or more processors are operable to trigger playback of the media item in dependence upon an input from a user.

25. A device according to claim 20, in which the one or more processors are operable to modulate the audio of the trophy object in dependence upon a virtual distance between the trophy object and the three dimensional representation of the game character associated with the user.

26. A device according to claim 1, in which the predetermined game event comprises any or all of:
a predetermined game score achieved by a game character;
a predetermined sequence of moves performed by a game character within the game;
completion of a game stage within the game;
completion of a predetermined game task within the game; and
acquisition by a game character of a predetermined game object within the game.

27. A device according to claim 1, in which the one or more processors are operable to generate metadata indicative of an attribute of the trophy object.

28. A device according to claim 1, in which each trophy object comprises an associated excellence score indicative of a value to a user of that trophy object.

29. A device according to claim 28, in which:
the one or more processors are operable to sum together the associated excellence scores of each respective trophy object stored in the storage arrangement so as to form a total trophy score; and
the one or more processors are operable to render the total trophy score as a virtual total trophy score object within the virtual environment.

30. A device according to claim 28, in which the one or more processors are operable to render the trophy objects within the virtual environment in dependence upon the excellence score associated with each respective trophy object.

31. A device according to claim 1, in which the one or more processors are operable to render the trophy object within the virtual environment in response to an input from a user.

32. A device according to claim 1, in which the one or more processors are operable to perform alpha blending with respect to the trophy object and the virtual environment so that the trophy object is rendered as a partially transparent object in the virtual environment.

33. A device according to claim 1, in which the device comprises a communication link operable to communicate with a mobile telecommunications device.

34. A device according to claim 33, in which the communication link is a short range wireless link.

35. A device according to claim 33, in which the entertainment device is operable to transmit a transmitted representation of the trophy object(s) to the mobile telecommunications device via the communication link.

36. A device according to claim 1, comprising a transceiver operable to transmit and/or receive the representation of the game feature to and/or from a second entertainment device.

37. A device according to claim 36, in which the one or more processors are operable to render the trophy object using the representation of the game feature received from the second entertainment device.

38. A device according to claim 37, in which:
the one or more processors are operable to detect whether the representation of the game feature received from the second entertainment device is the same as the representation of the game feature stored in the storage arrangement; and
the one or more processors are operable to render the trophy object within the virtual environment using the data received from the second entertainment device if the one or more processors detect that the received representation is not the same as the stored representation, and to render the trophy object within the virtual environment using the representation of the game feature stored in the storage arrangement if the one or more processors detect that the received representation is the same as the stored representation.

39. A device according to claim 38, in which:
the representation of the game feature comprises unique identifying data; and
the one or more processors detect whether the received representation and the stored representation are the same on the basis of a comparison between their respective unique identifying data.

40. A device according to claim 1, in which:
the one or more processors are operable to detect a virtual distance between the trophy object and the three dimensional avatar representation of the game character associated with the user; and
if the detected virtual distance between the trophy object and the avatar is less than a first predetermined distance, the one or more processors are operable to receive the high resolution image data from the second entertainment device.

41. A device according to claim 40, in which the one or more processors are operable to render the trophy object using the high resolution image data received from the second entertainment device if the detected virtual distance between the trophy object and the avatar is less than a second predetermined distance.

42. An entertainment system comprising a plurality of entertainment devices, each entertainment device of the entertainment system comprising one or more processors configured to:
detect whether a representation of a game feature of a game associated with the entertainment device and executed at the entertainment device using game software stored locally at the entertainment device should be obtained from the game in response to a predetermined game event of the game;
obtain the representation of the game feature from the game;
to store the representation of the game feature obtained from the game in a storage arrangement;
render the obtained representation of the game feature stored in the storage arrangement as a game feature within a virtual environment associated with the entertainment device, the virtual environment being an on-line virtual environment viewable by multiple on-line users and operable to display representations of game features relating to a plurality of the on-line users, the rendered game feature within the virtual environment being a trophy object in which the game associated with the entertainment device and from which the representation of the game feature may be obtained is different from the virtual environment associated with the entertainment device; and
receive the representation of the game feature from a second entertainment device,
in which the plurality of entertainment devices are operable to communicate with each other over a network, the representation of the game feature available for reception from the second entertainment device comprises high resolution image data relating to a high resolution version of the trophy object, and low resolution image data relating to a low resolution version of the trophy object,
the one or more processors are operable to selectively receive either or both of the low resolution image data and the high resolution image data from the second entertainment device in dependence upon a position of the trophy object with respect to a three-dimensional avatar representation of a game character associated with a user, and
the one or more processors are further operable to render the trophy object using either the low resolution image data or the high resolution image data received from the second entertainment device in dependence upon a detected position of the three-dimensional avatar representation with respect to the trophy object.

43. A system according to claim 42, in which the plurality of entertainment devices communicate over the network using a peer-to-peer communication protocol.

44. A system according to claim 42, in which the network comprises a network server and the plurality of entertainment devices are operable to communicate with each other using the server.

45. A method of rendering a virtual object within a virtual environment on an entertainment device, the method comprising:
detecting, by one or more processors, whether a representation of a game feature of one or more games associated with the entertainment device and executed at the entertainment device using game software stored locally at the entertainment device should be obtained from the one or more games in response to a predetermined game event of the one or more games;
obtaining, by the one or more processors, the representation of the game feature from the one or more games;
storing, in a storage arrangement, the representation of the game feature obtained from the one or more games;
rendering, by the one or more processors, the obtained representation of the game feature stored in the storage arrangement as a game feature within a virtual environment associated with the entertainment device, the virtual environment being an on-line virtual environment viewable by multiple on-line users and operable to display representations of game features relating to a plurality of the on-line users, the rendered game feature within the virtual environment being a trophy object in which the game associated with the entertainment device and from which the representation of the game feature may be obtained is different from the virtual environment associated with the entertainment device;

receiving the representation of the game feature from a second entertainment device;

in which the representation of the game feature available for reception from the second entertainment device comprises high resolution image data relating to a high resolution version of the trophy object, and low resolution image data relating to a low resolution version of the trophy object, and the method further comprises:

selectively receiving either or both of the low resolution image data and the high resolution image data from the second entertainment device in dependence upon a position of the trophy object with respect to a three-dimensional avatar representation of a game character associated with a user; and rendering, by the one or more processors, the trophy object using either the low resolution image data or the high resolution image data received from the second entertainment device in dependence upon a detected position of the three-dimensional avatar representation with respect to the trophy object.

46. A tangible, non-transitory computer readable data carrier storing computer readable instructions that when executed by a computer, cause the computer to carry out a method of rendering a virtual object within a virtual environment on an entertainment device, the method comprising:

detecting whether a representation of a game feature of one or more games associated with the entertainment device and executed at the entertainment device using game software stored locally at the entertainment device should be obtained from the one or more games in response to a predetermined game event of the one or more games;

obtaining the representation of the game feature from the one or more games;

storing, in a storage arrangement, the representation of the game feature obtained from the one or more games; and rendering the obtained representation of the game feature stored in the storage arrangement as a game feature within a virtual environment associated with the entertainment device, the virtual environment being an on-line virtual environment viewable by multiple on-line users and operable to display representations of game features relating to a plurality of the on-line users, the rendered game feature within the virtual environment being a trophy object in which the game associated with the entertainment device and from which the representation of the game feature may be obtained is different from the virtual environment associated with the entertainment device;

receiving the representation of the game feature from a second entertainment device;

in which the representation of the game feature available for reception from the second entertainment device comprises high resolution image data relating to a high resolution version of the trophy object, and low resolution image data relating to a low resolution version of the trophy object, and the method further comprises:

selectively receiving either or both of the low resolution image data and the high resolution image data from the second entertainment device in dependence upon a position of the trophy object with respect to a three-dimensional avatar representation of a game character associated with a user; and rendering the trophy object using either the low resolution image data or the high resolution image data received from the second entertainment device in dependence upon a detected position of the three-dimensional avatar representation with respect to the trophy object.

47. An entertainment device comprising one or more processors configured to:

detect whether a representation of a game feature of a game associated with the entertainment device and executed at the entertainment device using game software stored locally at the entertainment device should be obtained from the game in response to a predetermined game event of the game;

obtain the representation of the game feature from the game;

store the representation of the game feature obtained from the game in a storage arrangement; and render the obtained representation of the game feature stored in the storage arrangement as a game feature within a virtual environment associated with the entertainment device, the virtual environment being an on-line virtual environment viewable by multiple on-line users and operable to display representations of game features relating to a plurality of the on-line users, the rendered game feature within the virtual environment being a trophy object in which the game associated with the entertainment device and from which the representation of the game feature may be obtained is different from the virtual environment associated with the entertainment device;

in which:

the representation of the game feature comprises a media item and the trophy object comprises that media item;

the media item comprises audio material and video material;

the one or more processors are operable to render a virtual three dimensional avatar representation of a game character within the virtual environment, the game character being associated with a user; and the one or more processors are further operable to:

detect a virtual distance between the trophy object and the three dimensional avatar representation of the game character associated with the user, and selectively trigger playback of the media item, wherein the one or more processors trigger selectively the playback of the media item in response to the virtual distance between the trophy object and the avatar representation of the game character becoming less than a predetermined virtual distance.

* * * * *

UNITED STATES PATENT AND TRADEMARK OFFICE
CERTIFICATE OF CORRECTION

| | |
|---|---|
| PATENT NO. | : 9,259,641 B2 |
| APPLICATION NO. | : 12/528937 |
| DATED | : February 16, 2016 |
| INVENTOR(S) | : Tomas Owen Gillo, Scott Christopher Waugaman and Mitchell Robert Jay Goodwin |

Page 1 of 1

It is certified that error appears in the above-identified patent and that said Letters Patent is hereby corrected as shown below:

On the title page item (75) Under "*Inventors*", the city, state, country for Scott Christopher Waugaman should read -- San Francisco, CA (US) -- not London (GB).

Signed and Sealed this
Thirty-first Day of May, 2016

Michelle K. Lee
*Director of the United States Patent and Trademark Office*